(12) United States Patent
Takei

(10) Patent No.: US 12,308,991 B2
(45) Date of Patent: May 20, 2025

(54) INFORMATION PROCESSING METHOD, NON-TRANSITORY COMPUTER READABLE RECORDING MEDIUM STORING INFORMATION PROCESSING PROGRAM, AND INFORMATION PROCESSING DEVICE

(71) Applicant: Panasonic Intellectual Property Corporation of America, Torrance, CA (US)

(72) Inventor: Yoshihiko Takei, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/381,017

(22) Filed: Oct. 17, 2023

(65) Prior Publication Data

US 2024/0048401 A1 Feb. 8, 2024

Related U.S. Application Data

(63) Continuation of application No. PCT/JP2021/048607, filed on Dec. 27, 2021.

(30) Foreign Application Priority Data

Apr. 19, 2021 (JP) ................. 2021-070457

(51) Int. Cl.
*G06F 16/23* (2019.01)
*H04L 12/28* (2006.01)

(52) U.S. Cl.
CPC ........ *H04L 12/282* (2013.01); *G06F 16/2379* (2019.01); *H04L 12/2829* (2013.01)

(58) Field of Classification Search
CPC .............. G06F 16/2379; H04L 12/282; H04L 12/2829; H04L 67/00; H04Q 9/00
See application file for complete search history.

(56) References Cited

U.S. PATENT DOCUMENTS

| | | | | |
|---|---|---|---|---|
| 10,440,499 B2* | 10/2019 | Farrell | ................. | H04W 4/029 |
| 11,240,641 B1* | 2/2022 | Eberhardt | ............... | H04W 8/18 |
| 2014/0074972 A1 | 3/2014 | Togashi | | |
| 2020/0136847 A1* | 4/2020 | Serwatowski | ........ | H04L 9/3297 |
| 2023/0421955 A1* | 12/2023 | Torok | .................... | H04R 27/00 |

FOREIGN PATENT DOCUMENTS

JP 5596094 8/2014

OTHER PUBLICATIONS

International Search Report issued in International Pat. Appl. No. PCT/JP2021/048607, dated Mar. 8, 2022, along with an English translation thereof.

* cited by examiner

*Primary Examiner* — Merilyn P Nguyen
(74) *Attorney, Agent, or Firm* — Greenblum & Bernstein, P.L.C.

(57) ABSTRACT

An ID management server acquires a deletion request for requesting deletion of a first building ID associated with a group ID when a building used by at least one user is changed from a first building to a second building, deletes the first building ID associated with the group ID from a second table in response to the deletion request, and registers a second building ID for identifying the second building in a second table in association with the group ID.

9 Claims, 16 Drawing Sheets

FIG.3

| FAMILY ID | USER ID |
|---|---|
| FAMILY ID #X | USER ID #1, USER ID #2, USER ID #3 |
| | |

FIG.4

| FAMILY ID | HOME ID |
|---|---|
| FAMILY ID #X | FIRST HOME ID #A |
| | |

FIG.5

| HOME ID | DEVICE ID |
|---|---|
| FIRST HOME ID #A | DEVICE ID #a, DEVICE ID #b |
| | |

| FAMILY ID | HOME ID |
|---|---|
| FAMILY ID #X | |
| | |

| FAMILY ID | HOME ID |
|---|---|
| FAMILY ID #X | SECOND HOME ID #B |
| | |

| HOME ID | DEVICE ID |
|---|---|
| FIRST HOME ID #A | DEVICE ID #a, DEVICE ID #b |
| SECOND HOME ID #B | DEVICE ID #c, DEVICE ID #b |
| | |

FIG.8

| FAMILY ID | DEVICE ID |
|---|---|
| FAMILY ID #X | PORTABLE DEVICE ID #f |
|  |  |

INFORMATION PROCESSING METHOD, NON-TRANSITORY COMPUTER READABLE RECORDING MEDIUM STORING INFORMATION PROCESSING PROGRAM, AND INFORMATION PROCESSING DEVICE

FIELD OF INVENTION

The present disclosure relates to a technique for managing at least one user ID for identifying at least one user who uses a building and at least one device ID for identifying at least one device used in the building.

BACKGROUND ART

For example, Patent Literature 1 discloses a system for managing a plurality of accounts corresponding to a plurality of electronic devices and providing a service for exchanging or sharing information between the accounts linked to each other.

In Patent Literature 1, a service for exchanging or sharing information is executed between electronic devices linked to each other, between an electronic device and a user linked to each other, or between users linked to each other.

However, the above conventional technique does not disclose linking an electronic device and a building in which the electronic device is installed, and needs further improvement.

Patent Literature 1: JP 5596094 B2

SUMMARY OF THE INVENTION

The present disclosure has been made to solve the above problem, and an object of the present disclosure is to provide a technique that can easily change association between a user ID and a device ID and can simplify a complicated changing of IDs.

An information processing method of the present disclosure is a method in an information processing device that uses a first table in which at least one user ID for identifying at least one user who uses a first building is associated with a group ID for identifying a group to which the at least one user belongs, a second table in which the group ID is associated with a first building ID for identifying the first building, and a third table in which the first building ID is associated with at least one device ID for identifying at least one device used in the first building, the method including acquiring a deletion request for requesting deletion of the first building ID associated with the group ID in a case where a building used by the at least one user is changed from the first building to a second building, deleting the first building ID associated with the group ID from the second table in response to the deletion request, and registering a second building ID for identifying the second building in the second table in association with the group ID.

The present disclosure can easily change association between a user ID and a device ID and simplify complicated changing of IDs.

BRIEF DESCRIPTION OF THE DRAWINGS

FIG. 3 is a diagram illustrating an example of a family ID management table stored in a family ID management table storage in the present embodiment.

FIG. 4 is a diagram illustrating an example of a home ID management table stored in a home ID management table storage in the present embodiment.

FIG. 5 is a diagram illustrating an example of a device ID management table in which a first home ID and at least one device ID are associated with each other in the present embodiment.

FIG. 8 is a diagram illustrating an example of a portable device ID management table in which a family ID and at least one device ID are associated with each other in a modification of the present embodiment.

DETAILED DESCRIPTION (Knowledge Underlying Present Disclosure)

Figure 1:
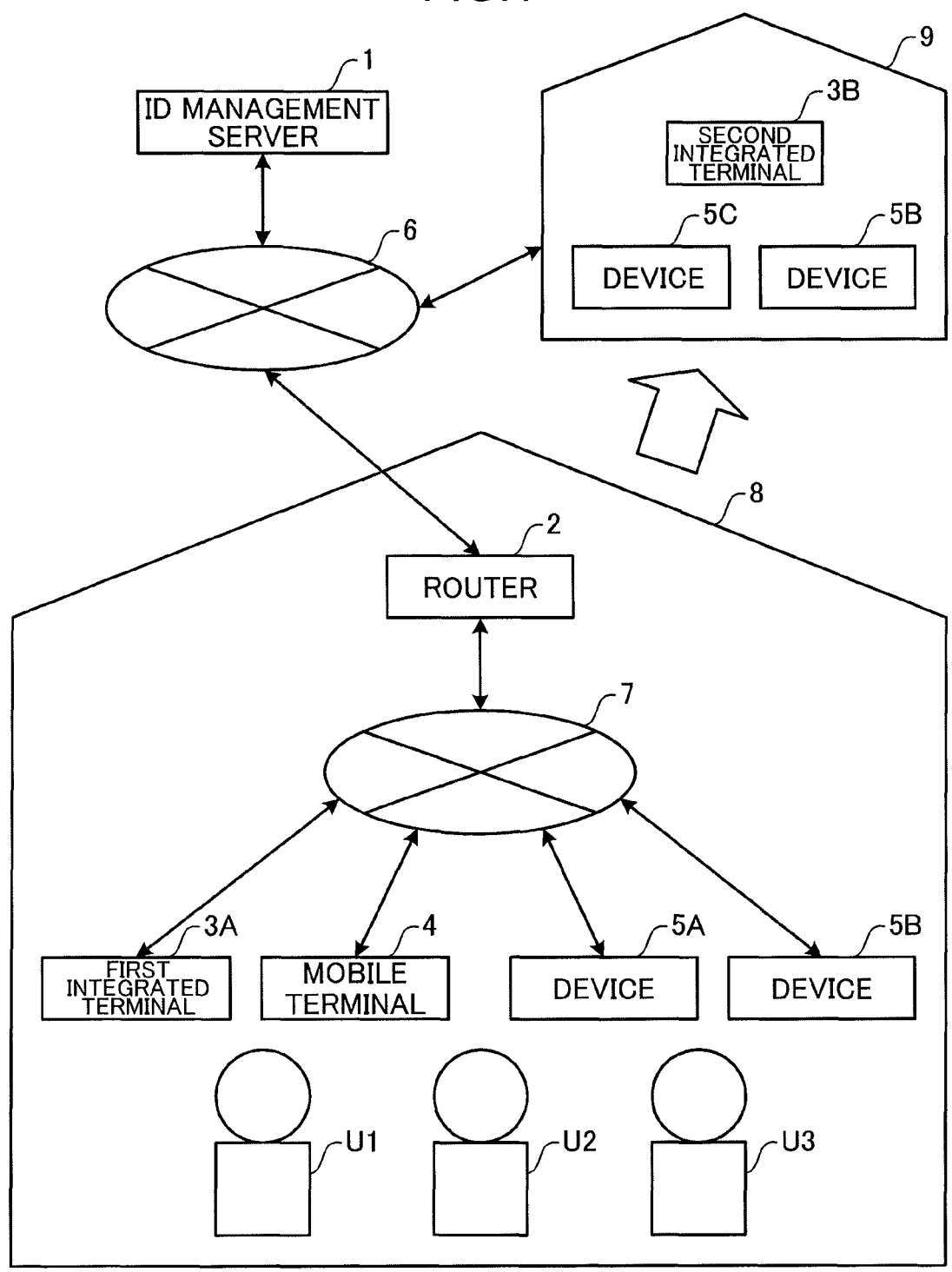
FIG. 1 is a diagram illustrating an example of a configuration of an ID management system according to an embodiment of the present disclosure.

In a case where a device installed in a building is controlled by using a user ID for identifying a user, the user ID and a device ID for identifying the device need to be associated with each other in advance. Since the user ID and the device ID are associated with each other in advance, the user can remotely operate the device corresponding to the device ID associated with the user ID by using the user ID.

At this time, in a case where a plurality of users use the building and a plurality of devices are installed in the building, the plurality of users need to perform setting for associating each user ID with each device ID of each of the plurality of devices.

In particular, in a case where the user changes residences, the user needs to perform setting for cancelling association between each device ID of a plurality of devices installed in a building before moving and the user ID, and perform setting for associating each device ID of a plurality of devices installed in a building after moving with the user ID. When the number of users and the number of devices increase, the settings become significantly complicated, and association between the user IDs and the device IDs becomes difficult.

In order to solve the above problem, an information processing method according to one aspect of the present disclosure is a method in an information processing device that uses a first table in which at least one user ID for identifying at least one user who uses a first building is associated with a group ID for identifying a group to which the at least one user belongs, a second table in which the group ID is associated with a first building ID for identifying the first building, and a third table in which the first building ID is associated with at least one device ID for identifying at least one device used in the first building, the method including acquiring a deletion request for requesting deletion of the first building ID associated with the group ID in a case where a building used by the at least one user is changed from the first building to a second building, deleting the first building ID associated with the group ID from the second table in response to the deletion request, and registering a second building ID for identifying the second building in the second table in association with the group ID.

In this configuration, at least one user ID for identifying at least one user who uses the first building and a group ID for identifying a group to which the at least one user belongs are associated with each other, the group ID and a first building ID for identifying the first building are associated with each other, and the first building ID and at least one device ID for identifying at least one device used in the first building are associated with each other. Then, in a case where the building used by at least one user is changed from the first building to the second building, the first building ID associated with the group ID is deleted, and the second building ID for identifying the second building is associated with the group ID.

Therefore, when the building used by the at least one user is changed from the first building to the second building, the association between the group ID and the first building ID only need to be changed instead of changing the association between the at least one user ID and the at least one device ID. Accordingly, the association between the user ID and the device ID can be easily changed, and complicated changing of IDs can be simplified.

The information processing method may further include acquiring a device ID of a control target device among the at least one device, a user ID of a user who uses the control target device among the at least one user, and a control command for the control target device, referring to the first table and specifying a group ID associated with the user ID having been acquired, referring to the second table and specifying a first building ID associated with the group ID having been specified, and referring to the third table, and sending the control command having been acquired to the control target device when the device ID having been acquired is associated with the first building ID having been specified.

This configuration acquires a device ID of a control target device among at least one device, a user ID of a user who uses the control target device among at least one user, and a control command for the control target device. Then, the first building ID is specified on the basis of the acquired user ID. When the acquired device ID is associated with the specified first building ID, the acquired control command is sent to the control target device. Therefore, the at least one user can operate the control target device by using each user ID.

In the information processing method, the at least one device may include a device fixed to the first building.

In this configuration, in a case where the building used by the at least one user is changed from the first building to the second building, the first building ID associated with the group ID is deleted, and thus the at least one user can be prevented from operating at least one device that is not used in the second building but is used only in the first building.

In the information processing method, the at least one device may include a device that is relocatable from the first building to the second building, the group ID and a device ID for identifying the device that is relocatable may be associated with a fourth table, the method further including acquiring a device ID of a control target device among the at least one device, a user ID of a user who uses the control target device among the at least one user, and a control command for the control target device, referring to the first table and specifying a group ID associated with the user ID having been acquired, and referring to the fourth table and sending the control command having been acquired to the control target device when the device ID having been acquired is associated with the group ID having been specified.

In this configuration, in a case where the building used by at least one user is changed from the first building to the second building, even when the first building ID associated with the group ID is deleted, the group ID is associated with the device ID for identifying the device that is relocatable from the first building to the second building. Therefore, at least one user who uses the second building can continuously operate at least one device relocated from the first building to the second building.

The information processing method may further include registering the second building ID and at least one device ID for identifying at least one device used in the second building in the third table in association with each other.

In this configuration, the second building ID is associated with the at least one device ID for identifying the at least one device used in the second building. Therefore, the user can operate the at least one device used in the second building by using the user ID.

In the information processing method, the group ID and setting information of the at least one device set in accordance with a lifestyle of the at least one user may be associated with a first setting information storage, the method further including in a case where the building used by the at least one user is changed from the first building to the second building, leaving association between the group ID and setting information of each of the plurality of devices in the first setting information storage, and deleting association between the group ID and setting information of a single device from the first setting information storage.

In this configuration, the group ID and the setting information of at least one device set in accordance with the lifestyle of at least one user are associated with each other. In a case where the building used by at least one user is changed from the first building to the second building, the association between the group ID and the setting information of each of the plurality of devices is left in the first setting information storage, and the association between the group ID and the setting information of a single device is deleted from the first setting information storage.

Here, the setting information of the plurality of devices is more likely to be created depending on the lifestyle of the user than the setting information of the single device. Therefore, in a case where the building used by at least one user is changed from the first building to the second building, the association between the group ID and the setting information of each of the plurality of devices is left in the first setting information storage. Thus, the setting information of the plurality of devices can be continuously used in the second building. In a case where the building used by at least one user is changed from the first building to the second building, the association between the group ID and the setting information of the single device is deleted from the first setting information storage. Thus, the setting information of the single device which is unnecessary in the second building can be deleted, and use capacity of a memory can be reduced.

In the information processing method, the first building ID and setting information of each of a plurality of devices fixed to the first building during a simultaneous operation of the plurality of devices may be associated with a second setting information storage, the method further including, in a case where the building used by the at least one user is changed from the first building to the second building, leaving association between the first building ID and the setting information of each of the plurality of devices in the second setting information storage.

In this configuration, the first building ID is associated with the setting information of each of the plurality of devices fixed to the first building during a simultaneous operation of the plurality of devices. In a case where the building used by at least one user is changed from the first building to the second building, the association between the first building ID and the setting information of each of the plurality of devices is left in the second setting information storage. Therefore, the setting information of each of the plurality of devices fixed to the first building during a simultaneous operation of the plurality of devices can be used only in the first building, and can be made unavailable in the second building after the first building ID associated with the group ID is deleted.

The present disclosure can be implemented not only as the information processing method for performing characteristic processing as described above, but also as an information processing device or the like having a characteristic configuration corresponding to a characteristic method performed by the information processing method. The present disclosure can also be implemented as a computer program that causes a computer to execute characteristic processing included the information processing method described above. Thus, other aspects below can also achieve an effect as in the information processing method.

A non-transitory computer readable recording medium storing an information processing program according to another aspect of the present disclosure is a program for using a first table in which at least one user ID for identifying at least one user who uses a first building is associated with a group ID for identifying a group to which the at least one user belongs, a second table in which the group ID is associated with a first building ID for identifying the first building, and a third table in which the first building ID is associated with at least one device ID for identifying at least one device used in the first building, the program causing a computer to execute processing of acquiring a deletion request for requesting deletion of the first building ID associated with the group ID in a case where a building used by the at least one user is changed from the first building to a second building, deleting the first building ID associated with the group ID from the second table in response to the deletion request, and registering a second building ID for identifying the second building in the second table in association with the group ID.

An information processing device according to another aspect of the present disclosure is a device that uses a first table in which at least one user ID for identifying at least one user who uses a first building is associated with a group ID for identifying a group to which the at least one user belongs, a second table in which the group ID is associated with a first building ID for identifying the first building, and a third table in which the first building ID is associated with at least one device ID for identifying at least one device used in the first building, the device including a deletion request acquisition unit that acquires a deletion request for requesting deletion of the first building ID associated with the group ID in a case where a building used by the at least one user is changed from the first building to a second building, a deletion processor that deletes the first building ID associated with the group ID from the second table in response to the deletion request, and a registration processor that registers a second building ID for identifying the second building in the second table in association with the group ID.

Hereinafter, an embodiment of the present disclosure will be described with reference to the accompanying drawings. The following embodiment is an example of realization of the present disclosure, and is not intended to limit the technical scope of the present disclosure.

EMBODIMENT

FIG. 1 is a diagram illustrating an example of a configuration of an ID management system according to the embodiment of the present disclosure. The ID management system illustrated in FIG. 1 includes an ID management server 1, a router 2, a first integrated terminal 3A, a mobile terminal 4, and devices 5A and 5B. The router 2, the first integrated terminal 3A, and the devices and 5B are installed in a first residence 8.

The ID management server 1 manages at least one user ID for identifying at least one user who uses the first residence 8, a family ID for identifying a group to which the at least one user belongs, a first home ID for identifying the first residence 8, a second home ID for identifying a second residence 9, and at least one device ID for identifying at least one device used in the first residence 8.

The first residence 8 is an example of a first building, the second residence 9 is an example of a second building, the family ID is an example of a group ID, the first home ID is an example of a first building ID, and the second home ID is an example of a second building ID. A configuration of the ID management server 1 will be described later.

The first residence 8 is a residence of users U1, U2, and U3, and the users U1, U2, and U3 are family members. Note that the users U1, U2, and U3 may be roommates who are not family members, or may be persons who share the same building.

The router 2 is installed in the first residence 8. The router 2 is a communication device that connects a wide area network (WAN) 6 and a local area network (LAN) 7 and relays data. The WAN 6 is, for example, a general telephone line or an internet such as an integrated services digital network (ISDN), and the LAN 7 is, for example, Ethernet (registered trademark).

The first integrated terminal 3A is installed in, for example, a living room in the first residence 8, and is a controller for integrally controlling the plurality of devices 5A and 5B used in the first residence 8. The first integrated terminal 3A includes a display and an input unit. The first integrated terminal 3A may include a touch panel having functions of a display and an input unit. The first integrated terminal 3A receives operation by the user of the device 5A and the device 5B, and controls the device 5A and the device 5B in accordance with received operation content. The input unit of the first integrated terminal 3A may receive operation by the user by voice information. At this time, the input unit is a microphone.

The mobile terminal 4 is a smartphone, a tablet computer, or a personal computer, for example, and is possessed by the user using the first residence 8. The mobile terminal 4 receives operation by the user of the device 5A and the device 5B, and controls the device 5A and the device in accordance with received operation content. The ID management system may include a plurality of mobile terminals 4 possessed by a plurality of users who use first residence 8, instead of one mobile terminal 4.

The device 5A is, for example, housing equipment such as a lighting device, a device for opening and closing a shutter, or a hot water supply installed in the first residence 8, and is a device fixed to the first residence 8 (first building). The device 5A is used only in the first residence 8 and cannot be relocated to the second residence 9.

The device 5B is, for example, a home appliance such as a television, a refrigerator, a washing machine, or a microwave oven installed in the first residence 8, and is a device that is relocatable from the first residence 8 to the second residence 9.

The second residence 9 is a residence as a moving destination of the users U1, U2, and U3 who live in the first residence 8. The second residence 9, like the first residence 8, includes a router 2, a second integrated terminal 3B, a mobile terminal 4 and devices 5C and 5B. In FIG. 1, the router 2 and the mobile terminal 4 installed in the second residence 9 are not shown.

The device 5C is, for example, housing equipment such as a lighting device, a device for opening and closing a shutter, or a hot water supply installed in the second residence 9, and is a device fixed to the second residence 9 (second building). The device 5C is used only in the second residence 9 and cannot be relocated to another residence. The first integrated terminal 3A and the device 5A of the first residence 8 are provided in the first residence 8 and cannot be relocated from the first residence 8 to the second residence 9. Therefore, the second integrated terminal 3B and the device 5C of the second residence 9 are different devices having the same functions as the first integrated terminal 3A and the device 5A of the first residence 8.

The devices 5A, 5B, and 5C are shared by users U1, U2, and U3 who live in the first residence 8 and the second residence 9. The users U1, U2, and U3 operate the devices 5A, 5B, and 5C using the respective user IDs.

Figure 2:
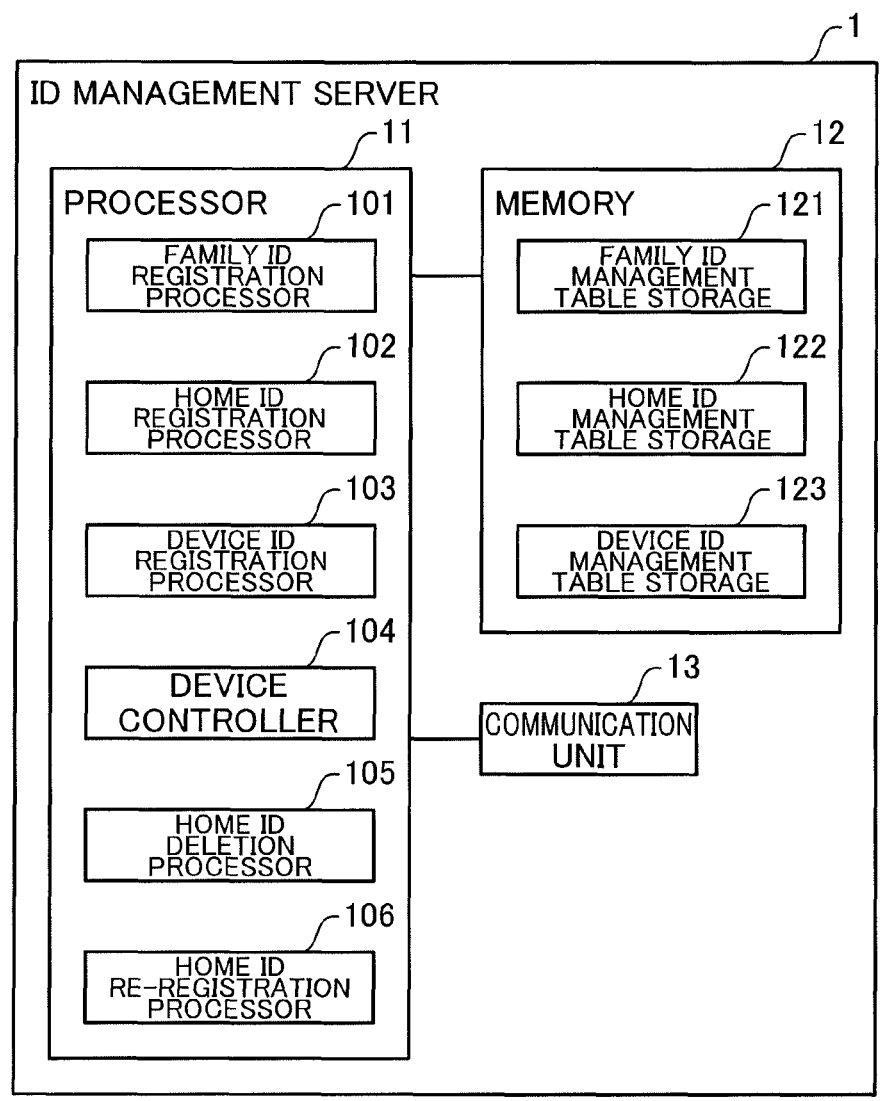
FIG. 2 is a diagram illustrating an example of a configuration of an ID management server according to the embodiment of the present disclosure.

FIG. 2 is a diagram illustrating an example of a configuration of the ID management server 1 according to the embodiment of the present disclosure.

The ID management server 1 illustrated in FIG. 2 includes a processor 11, a memory 12, and a communication unit 13.

The processor 11 is, for example, a central processing unit (CPU). The processor 11 implements a family ID registration processor 101, a home ID registration processor 102, a device ID registration processor 103, a device controller 104, a home ID deletion processor 105, and a home ID re-registration processor 106.

The memory 12 is a storage device capable of storing various types of information, such as a random access memory (RAM), a hard disk drive (HDD), a solid state drive (SSD), or a flash memory. The memory 12 implements a family ID management table storage 121, a home ID management table storage 122, and a device ID management table storage 123.

The family ID registration processor 101 registers, in a family ID management table (first table), at least one user ID for identifying at least one user who uses the first residence 8 (first building) and a family ID (group ID) for identifying a group to which the at least one user belongs in association with each other.

Here, the first integrated terminal 3A sends, to the ID management server 1, a family ID registration request for registering at least one user ID and a family ID in the family ID management table in association with each other. The family ID registration request includes at least one user ID. The user ID is, for example, a mail address of the mobile terminal 4 possessed by the user, and is an identifier capable of uniquely identifying the user. The communication unit 13 of the ID management server 1 receives the family ID registration request sent by the first integrated terminal 3A. When the family ID registration request is received by the communication unit 13, the family ID registration processor 101 automatically generates a family ID to be associated with at least one user ID. At this time, the family ID registration processor 101 generates, for example, a family ID obtained by randomly combining numbers and/or alphabets. Here, the family ID registration processor 101 registers at least one user ID and the generated family ID in the family ID management table in association with each other.

The family ID management table storage 121 stores the family ID management table in which the at least one user ID and the family ID (group ID) are associated with each other.

FIG. 3 is a diagram illustrating an example of the family ID management table stored in the family ID management table storage 121 in the present embodiment.

The family ID management table associates at least one user ID with the family ID. In the family ID management table illustrated in FIG. 3, for example, a user ID #1, a user ID #2, and a user ID #3 are associated with a family ID #X. The user ID #1 is a user ID of the user U1, the user ID #2 is a user ID of the user U2, and the user ID #3 is a user ID of the user U3. The family ID #X is a family ID generated by the family ID registration processor 101.

The home ID registration processor 102 registers a family ID (group ID) and a first home ID (first building ID) for identifying the first residence 8 (first building) in a home ID management table (second table) in association with each other.

Here, the first integrated terminal 3A sends, to the ID management server 1, a home ID registration request for registering the family ID and the first home ID in the home ID management table in association with each other. The first home ID is, for example, an integrated terminal ID for uniquely identifying the first integrated terminal 3A installed in the first residence 8. The integrated terminal ID is, for example, a serial number unique to the first integrated terminal 3A, and is stored in advance in a memory of the first integrated terminal 3A. The integrated terminal ID may be indicated on a label attached to a body of the first integrated terminal 3A. The first integrated terminal 3A may receive input of the integrated terminal ID by the user who has visually observed the integrated terminal ID. The home ID registration request includes a user ID and a first home ID. The communication unit 13 of the ID management server 1 receives the home ID registration request sent by the first integrated terminal 3A. When the home ID registration request is received by the communication unit 13, the home ID registration processor 102 specifies a family ID associated with the user ID, and registers the specified family ID and the first home ID in the home ID management table in association with each other.

The home ID management table storage 122 stores the home ID management table (second table) in which the family ID (group ID) and the home ID (first building ID) are associated with each other.

FIG. 4 is a diagram illustrating an example of the home ID management table stored in the home ID management table storage 122 in the present embodiment.

The home ID management table associates a family ID with a home ID. The home ID management table illustrated in FIG. 4 associates, for example, the family ID #X with the first home ID #A. The first home ID #A is a home ID for identifying the first residence 8, and is an integrated terminal ID for identifying the first integrated terminal 3A installed in the first residence 8.

The device ID registration processor 103 registers the first home ID (first building ID) and at least one device ID for identifying at least one device used in the first residence 8 (first building) in association with each other in a device ID management table (third table).

Here, the first integrated terminal 3A sends, to the ID management server 1, a device ID registration request for registering the first home ID and at least one device ID in the device ID management table in association with each other. The device ID is, for example, a device ID for identifying the devices 5A and 5B used in the first residence 8. The device ID is, for example, a serial number unique to each of the devices 5A and 5B, and is stored in advance in a memory of the devices 5A and 5B. The first integrated terminal 3A searches for the devices 5A and 5B connected to the LAN 7, and receives the device IDs from the devices 5A and 5B. The device ID may be indicated on a label attached to a body of each of the devices 5A and 5B. The first integrated terminal 3A may receive input of the device ID by the user who has visually observed the device ID. The device ID registration request includes a user ID and a device ID. The communication unit 13 of the ID management server 1 receives the device ID registration request sent by the first integrated terminal 3A. When the device ID registration request is received by the communication unit 13, the device ID registration processor 103 specifies a family ID associated with the user ID, specifies a first home ID associated with the family ID, and registers the specified first home ID and at least one device ID in the device ID management table in association with each other.

The device ID management table storage 123 stores the device ID management table in which the first home ID (first building ID) and the at least one device ID are associated with each other.

FIG. 5 is a diagram illustrating an example of the device ID management table in which the first home ID and the at least one device ID are associated with each other in the present embodiment.

The device ID management table associates a home ID with at least one device ID. The device ID management table illustrated in FIG. 5 associates, for example, the first home ID #A with a device ID #a and a device ID #b. The device ID #a is a device ID for identifying the device 5A, and the device ID #b is a device ID for identifying the device 5B.

The device controller 104 controls at least one device on the basis of at least one device ID specified by at least one user ID, a family ID (group ID), and a first home ID (first building ID).

The communication unit 13 acquires a device ID of a control target device among at least one device, a user ID of a user who uses the control target device among at least one user, and a control command for the control target device. The device controller 104 refers to the family ID management table (first table) and specifies a family ID (group ID) associated with the user ID acquired by the communication unit 13. The device controller 104 refers to the home ID management table (second table) and specifies a first family ID (first building ID) associated with the specified family ID (group ID). The device controller 104 refers to the device ID management table (third table) and determines whether the device ID acquired by the communication unit 13 is associated with the first home ID (first building ID). In a case where the device ID acquired by the communication unit 13 is associated with the first home ID (first building ID), the device controller 104 controls the communication unit 13 to send the control command acquired by the communication unit 13 to the control target device. The communication unit 13 sends the control command to the control target device.

In a case where the residence (building) used by at least one user is changed from the first residence 8 (first building) to the second residence 9 (second building), the communication unit 13 acquires a home ID deletion request for requesting deletion of the first home ID (first building ID) associated with the family ID (group ID).

Here, in a case where the residence used by at least one user is changed from the first residence 8 to the second residence 9, the second integrated terminal 3B installed in the second residence 9 sends a home ID deletion request for requesting deletion of the first home ID associated with the family ID to the ID management server 1. The home ID deletion request includes at least one user ID. The communication unit 13 of the ID management server 1 receives the home ID deletion request sent by the second integrated terminal 3B.

The home ID deletion processor 105 deletes the first family ID (first building ID) associated with the family ID (group ID) from the home ID management table (second table) in response to the home ID deletion request. When the home ID deletion request is received by the communication unit 13, the home ID deletion processor 105 deletes a first home ID associated with the family ID from the home ID management table.

The communication unit 13 acquires a second home ID (second building ID) for identifying the second residence 9 (second building).

Here, in a case where the residence used by at least one user is changed from the first residence 8 to the second residence 9, the second integrated terminal 3B installed in the second residence 9 sends, to the ID management server 1, a home ID re-registration request for registering the second home ID for identifying the second residence 9 in the home ID management table in association with the family ID. The second home ID is, for example, an integrated terminal ID for identifying the second integrated terminal 3B installed in the second residence 9. The integrated terminal ID is, for example, a serial number unique to the second integrated terminal 3B, and is stored in advance in a memory of the second integrated terminal 3B. The integrated terminal ID may be indicated on a label attached to a body of the second integrated terminal 3B. The second integrated terminal 3B may receive input of the integrated terminal ID by the user who has visually observed the integrated terminal ID. The home ID re-registration request includes a user ID and a second home ID. The communication unit 13 of the ID management server 1 receives the home ID re-registration request sent by the second integrated terminal 3B.

The home ID re-registration processor 106 registers the second home ID (second building ID) acquired by the communication unit 13 in the home ID management table (second table) in association with the family ID (group ID). When the communication unit 13 receives the home ID re-registration request, the home ID re-registration processor 106 registers the second home ID in the home ID management table in association with the family ID.

Figures 6, 7:
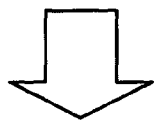
FIG. 6 is a diagram illustrating a home ID management table from which the first home ID has been deleted and the home ID management table in which a second home ID has been registered in the present embodiment.
FIG. 7 is a diagram illustrating an example of a device ID management table in which the first home ID and at least one device ID are associated with each other and the second home ID and at least one device ID are associated with each other in the present embodiment.

FIG. 6 is a diagram illustrating the home ID management table from which the first home ID has been deleted and the home ID management table in which the second home ID has been registered in the present embodiment.

When the home ID deletion request is received, the home ID deletion processor 105 deletes a first home ID associated with the family ID from the home ID management table. In the home ID management table illustrated in FIG. 6, the first home ID #A associated with the family ID #X is deleted.

When the home ID re-registration request is received, the home ID re-registration processor 106 registers the second home ID acquired by the communication unit 13 in the home ID management table in association with the family ID. In the home ID management table illustrated in FIG. 6, the second home ID #B is registered in association with the family ID #X.

In this manner, when the users U1, U2, and U3 move from the first residence 8 to the second residence 9, the home ID associated with the family ID #X is changed from the first home ID #A to the second home ID #B.

The device ID registration processor 103 registers the second home ID (second building ID) and at least one device ID for identifying at least one device used in the second residence 9 (second building) in association with each other in the device ID management table (third table).

Here, the second integrated terminal 3B installed in the second residence 9 sends, to the ID management server 1, a device ID registration request for registering the second home ID and at least one device ID in the device ID management table in association with each other. The device ID is, for example, a device ID for identifying the devices 5C and 5B used in the second residence 9. The device 5C is, for example, housing equipment such as a lighting device, a device for opening and closing a shutter, or a hot water supply installed in the second residence 9, and is a device fixed to the second residence 9 (second building). The device 5B is a device relocated from the first residence 8 to the second residence 9. The device ID is, for example, a serial number unique to each of the devices 5C and 5B, and is stored in advance in a memory of the devices 5C and 5B.

The second integrated terminal 3B searches for the devices 5C and 5B connected to the LAN 7, and receives the device IDs from the devices 5C and 5B. The device ID may be indicated on a label attached to a body of each of the devices 5C and 5B. The second integrated terminal 3B may receive input of the device ID by the user who has visually observed the device ID. The device ID registration request includes a user ID and a device ID. The communication unit 13 of the ID management server 1 receives the device ID registration request sent by the second integrated terminal 3B.

When the device ID registration request is received by the communication unit 13, the device ID registration processor 103 specifies a family ID associated with the user ID, specifies a second home ID associated with the family ID, and registers the specified second home ID and at least one device ID in the device ID management table in association with each other.

The device ID management table storage 123 stores the device ID management table in which the second home ID (second building ID) and the at least one device ID are associated with each other.

FIG. 7 is a diagram illustrating an example of the device ID management table in which the first home ID and at least one device ID are associated with each other and the second home ID and at least one device ID are associated with each other in the present embodiment.

The device ID management table illustrated in FIG. 7, for example, associates the first home ID #A with the device ID #a and the device ID #b, and also associates the second home ID #B with a device ID #c and the device ID #b. The device ID #a is a device ID for identifying the device 5A, the device ID #b is a device ID for identifying the device 5B, and the device ID #c is a device ID for identifying the device 5C.

The user who moves from the first residence 8 to the second residence 9 may register the second home ID and at least one device ID in the device ID management table by using the second integrated terminal 3B. However, when the second home ID and the at least one device ID are already registered in the device ID management table, the user who moves from the first residence 8 to the second residence 9 need not register the second home ID and the at least one device ID in the device ID management table by using the second integrated terminal 3B. For example, in a case where the second residence 9 is newly built, the user who moves from the first residence 8 to the second residence 9 need to register the second home ID and at least one device ID in the device ID management table by using the second integrated terminal 3B. However, in a case where the second residence 9 is a used property, and the second home ID and the at least one device ID are already registered in the device ID management table, the user who moves from the first residence 8 to the second residence 9 need not register the second home ID and the at least one device ID in the device ID management table, and can use the device ID management table in which the second home ID and the at least one device ID are already associated with each other.

In the present embodiment, the device ID registration processor 103 registers the first home ID and the device ID of the device 5A fixed to the first residence 8 and the device ID of the device 5B that is relocatable from the first residence 8 to the second residence 9 in the device ID management table in association with each other. However, the present disclosure is not limited to thereto. The device ID registration processor 103 may register the first home ID and the device ID of the device 5A fixed to the first residence 8 in the device ID management table in association with each other without associating the first home ID with the device ID of the device 5B that is relocatable from the first residence 8 to the second residence 9.

In a modification of the present embodiment, the device ID registration processor 103 may register the family ID (group ID) and the device ID for identifying the device 5B that is relocatable from the first residence 8 (first building) to the second residence 9 (second building) in a portable device ID management table (fourth table) in association with each other. In this case, the memory 12 may further include a portable device ID management table storage for storing the portable device ID management table.

FIG. 8 is a diagram illustrating an example of the portable device ID management table in which a family ID and at least one device ID are associated with each other in the modification of the present embodiment.

The portable device ID management table associates a family ID with a device ID for identifying the device 5B that is relocatable from the first residence 8 to the second residence 9. The portable device ID management table illustrated in FIG. 8 associates, for example, the family ID #X with a portable device ID #f. The portable device ID #f is a device ID for identifying the device 5B that is relocatable from the first residence 8 to the second residence 9.

When the device ID is input, the first integrated terminal 3A may receive selection as to whether to associate the device ID with the first home ID or the family ID. In a case where the device ID is associated with the first home ID, the device ID registration processor 103 registers the first home ID and at least one device ID in the device ID management table (third table) in association with each other. On the other hand, in a case where the device ID is associated with the family ID, the device ID registration processor 103 registers the family ID and at least one device ID in the portable device ID management table (fourth table) in association with each other.

Then, in a case where the communication unit 13 acquires the device ID of the control target device among the at least one device, the user ID of the user who uses the control target device among the at least one user, and the control command for the control target device, the device controller 104 may refer to the family ID management table (first table) and specify the family ID (group ID) associated with the user ID acquired by the communication unit 13. The device controller 104 may refer to the portable device ID management table (fourth table) and determine whether the device ID acquired by the communication unit 13 is associated with the family ID (group ID). In a case where the device ID acquired by the communication unit 13 is associated with the family ID (group ID), the device controller 104 may control the communication unit 13 to send the control command acquired by the communication unit 13 to the control target device. The communication unit 13 may send the control command to the control target device.

As described above, in the modification of the present embodiment, the family ID is associated with the device ID for identifying the device 5B that is relocatable from the first residence 8 to the second residence 9. Thus, when the user moves from the first residence 8 to the second residence 9, even if the first home ID associated with the family ID is deleted and the second home ID is newly associated with the family ID, it is not necessary to newly associate the device ID of the device 5B with the second home ID. As a result, when the user moves from the first residence 8 to the second residence 9, the user can still remotely control the device 5B associated with the family ID by using the user ID.

The following is a description of ID registration processing by the ID management system according to the embodiment of the present disclosure.

Figure 9:
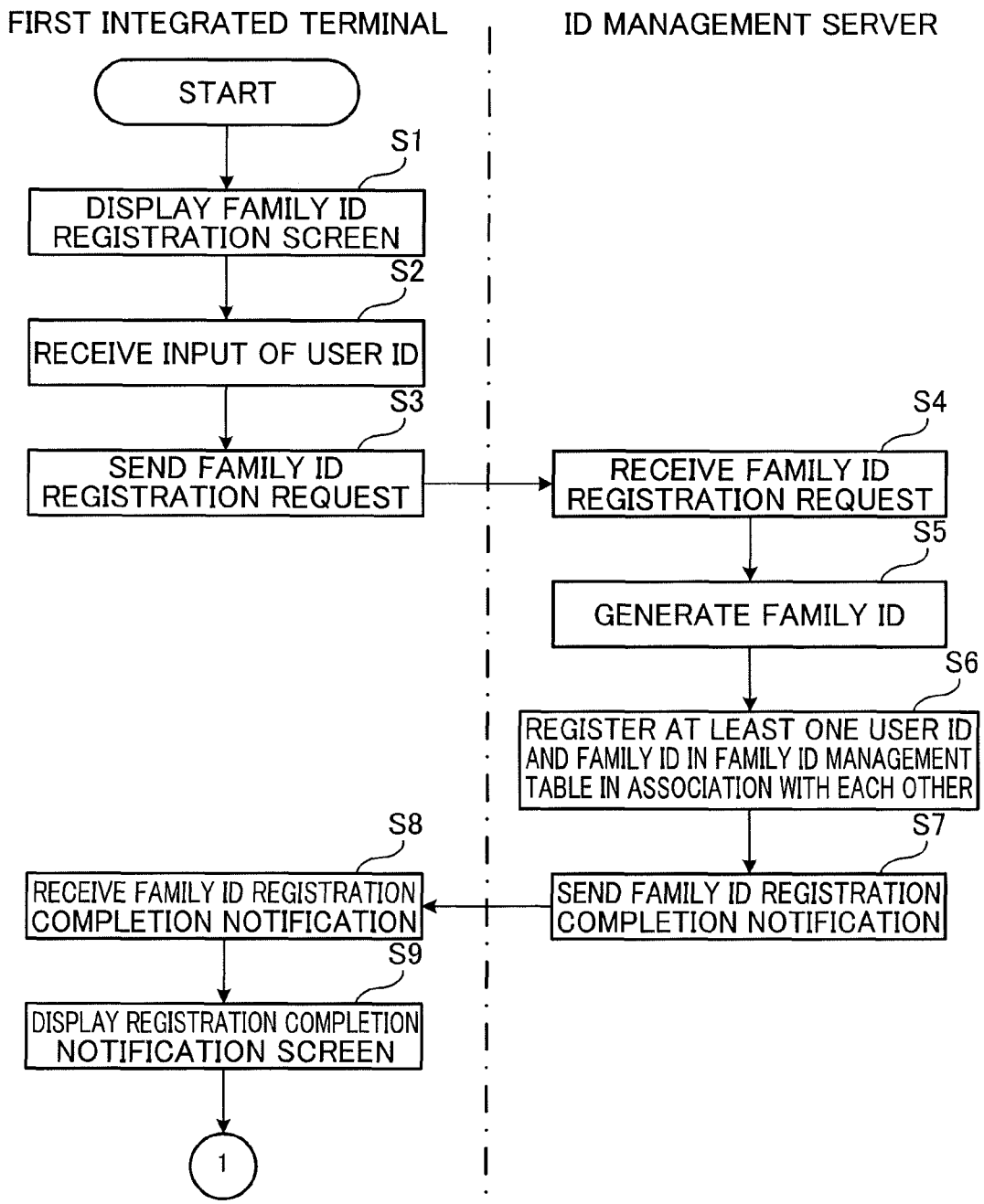
FIG. 9 is a first flowchart for describing ID registration processing by the ID management system according to the embodiment of the present disclosure.
Figure 10:
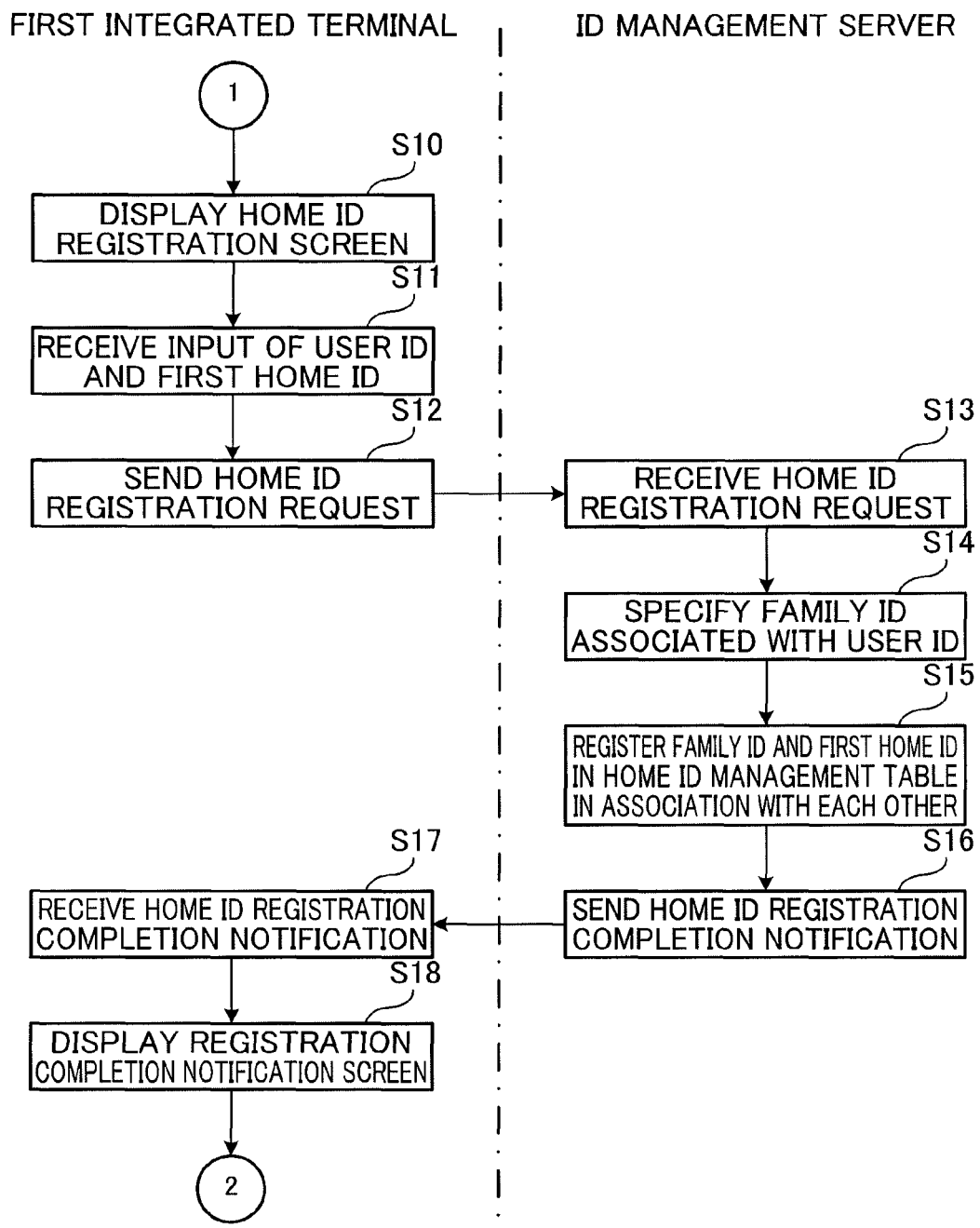
FIG. 10 is a second flowchart for describing the ID registration processing by the ID management system according to the embodiment of the present disclosure.
Figure 11:
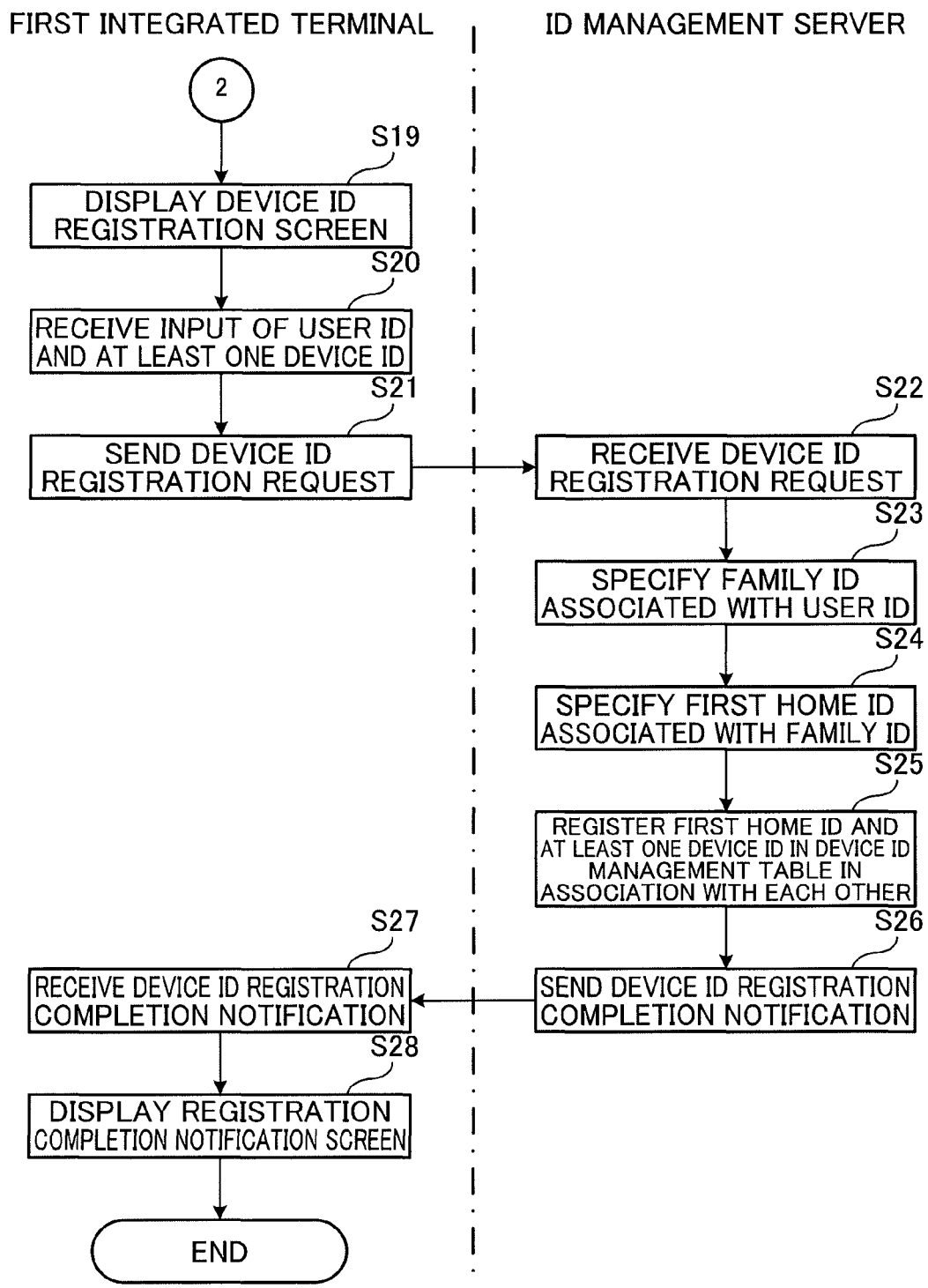
FIG. 11 is a third flowchart for describing the ID registration processing by the ID management system according to the embodiment of the present disclosure.

FIG. 9 is a first flowchart for describing the ID registration processing by the ID management system according to the embodiment of the present disclosure. FIG. 10 is a second flowchart for describing the ID registration processing by the ID management system according to the embodiment of the present disclosure. FIG. 11 is a third flowchart for describing the ID registration processing by the ID management system according to the embodiment of the present disclosure. The ID registration processing is performed by the first integrated terminal 3A installed in the first residence 8. The ID registration processing includes family ID registration processing, home ID registration processing, and device ID registration processing.

First, in step S1, the first integrated terminal 3A displays a family ID registration screen for registering at least one user ID and a family ID in the family ID management table in association with each other.

Next, in step S2, the first integrated terminal 3A receives input of at least one user ID for identifying at least one user who uses the first residence 8.

Then, in step S3, the first integrated terminal 3A sends, to the ID management server 1, a family ID registration request for registering at least one user ID and a family ID in the family ID management table in association with each other. The family ID registration request includes the at least one user ID having been input.

Figure 12:
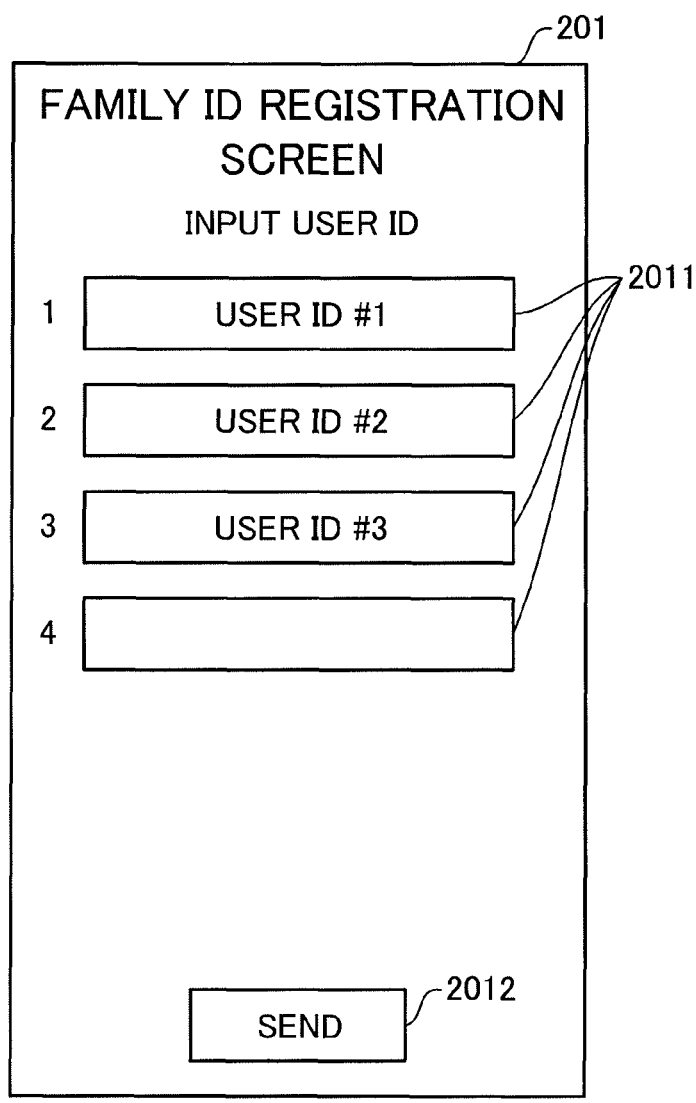
FIG. 12 is a diagram illustrating an example of a family ID registration screen displayed on a first integrated terminal in the present embodiment.

FIG. 12 is a diagram illustrating an example of the family ID registration screen displayed on the first integrated terminal 3A in the present embodiment.

The first integrated terminal 3A displays a family ID registration screen 201 illustrated in FIG. 12. The family ID registration screen 201 includes a user ID input field 2011 for inputting at least one user ID for identifying at least one user who uses the first residence 8. On the family ID registration screen 201, one user who uses the first residence 8 inputs user IDs of all users (family members) who use the first residence 8 into the user ID input field 2011. Here, three users U1, U2, and U3 use the first residence 8. The first integrated terminal 3A receives input of user IDs of all the users who use the first residence 8 by the one user who uses the first residence 8. On the family ID registration screen 201, the user IDs of the three users U1, U2, and U3 are input.

The family ID registration screen 201 includes a send button 2012 for sending the at least one user ID having been input. When the send button 2012 is touched, a family ID registration request is sent to the ID management server 1.

Then, in FIG. 9, in step S4, the communication unit 13 of the ID management server 1 receives the family ID registration request sent by the first integrated terminal 3A.

Next, in step S5, the family ID registration processor 101 generates a family ID to be associated with at least one user ID.

In step S6, the family ID registration processor 101 registers the at least one user ID having been received and the generated family ID in the family ID management table in association with each other.

In step S7, the communication unit 13 sends, to the first integrated terminal 3A, a family ID registration completion notification for notifying that the registration of the family ID has been completed.

In step S8, the first integrated terminal 3A receives the family ID registration completion notification sent by the ID management server 1.

In step S9, the first integrated terminal 3A displays a registration completion notification screen for notifying the user that the registration of the at least one user ID and the family ID has been completed. On the registration completion notification screen, the family ID associated with the at least one user ID is displayed.

The above processing of steps S1 to S9 is the family ID registration processing.

In step S10, the first integrated terminal 3A displays a home ID registration screen for registering the family ID and the first home ID for identifying the first residence 8 in the home ID management table in association with each other.

In step S11, the first integrated terminal 3A receives input of the user 1D and the first home ID.

In step S12, the first integrated terminal 3A sends, to the ID management server 1, a home ID registration request for registering the family ID and the first home ID in the home ID management table in association with each other. The home ID registration request includes the user ID and the first home ID having been input.

Figure 13:
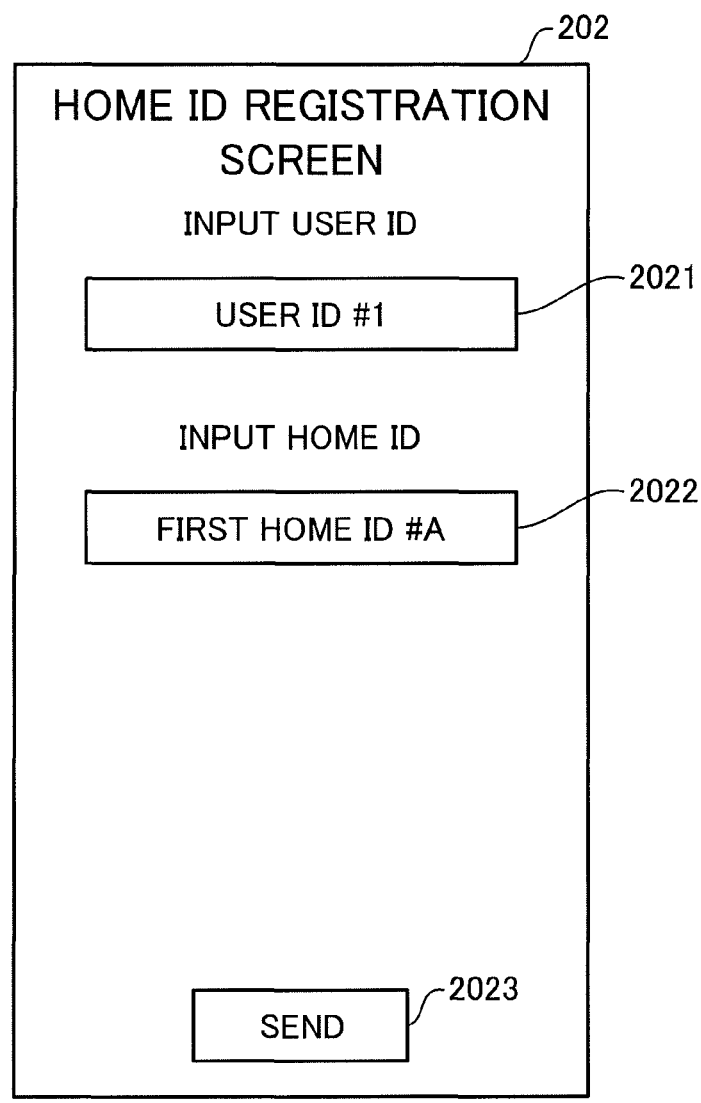
FIG. 13 is a diagram illustrating an example of a home ID registration screen displayed on the first integrated terminal in the present embodiment.

FIG. 13 is a diagram illustrating an example of the home ID registration screen displayed on the first integrated terminal 3A in the present embodiment.

The first integrated terminal 3A displays a home ID registration screen 202 illustrated in FIG. 13. The home ID registration screen 202 includes a user ID input field 2021 for inputting a user ID and a home ID input field 2022 for inputting a first home ID for identifying the first residence 8. On the home ID registration screen 202, one user who uses the first residence 8 inputs his/her own user ID into the user ID input field 2021. Here, three users U1, U2, and U3 use the first residence 8. The first integrated terminal 3A receives input of a user ID by one user U1 of the three users U1, U2, and U3 who use the first residence 8. On the home ID registration screen 202, the user ID of the user U1 is input.

On the home ID registration screen 202, one user who uses the first residence 8 inputs the first home ID for identifying the first residence 8 into the home ID input field 2022. The first home ID is a serial number unique to the first integrated terminal 3A, and is indicated on a label attached to the body of the first integrated terminal 3A. The user U1 inputs, as the first home ID, the serial number indicated on the label attached to the body of the first integrated terminal 3A. The first integrated terminal 3A receives input of the first home ID by the user U1. On the home ID registration screen 202, the first home ID of the first residence 8 is input.

The home ID registration screen 202 includes a send button 2023 for sending the user ID and the first home ID having been input. When the send button 2023 is touched, a home ID registration request is sent to the ID management server 1.

In FIG. 10, in step S13, the communication unit 13 of the ID management server 1 receives the home ID registration request sent by the first integrated terminal 3A.

Next, in step S14, the home ID registration processor 102 refers to the family ID management table and specifies the family ID associated with the user ID included in the home ID registration request received by the communication unit 13.

Then, in step S15, the home ID registration processor 102 registers the specified family ID and the first home ID included in the home ID registration request received by the communication unit 13 in the home ID management table in association with each other.

In step S16, the communication unit 13 sends, to the first integrated terminal 3A, a home ID registration completion notification for notifying that the registration of the first home ID has been completed.

In step S17, the first integrated terminal 3A receives the home ID registration completion notification sent by the ID management server 1.

In step S18, the first integrated terminal 3A displays a registration completion notification screen for notifying the user that the registration of the family ID and the first home ID has been completed.

The above processing of steps S10 to S18 is the home ID registration processing.

In step S19, the first integrated terminal 3A displays a device ID registration screen for registering the first home ID and at least one device ID for identifying at least one device used in the first residence 8 in association with each other in the device ID management table.

In step S20, the first integrated terminal 3A receives input of the user ID and the at least one device ID.

In step S21, the first integrated terminal 3A sends, to the ID management server 1, a device ID registration request for registering a family ID and at least one device ID in the device ID management table in association with each other. The device ID registration request includes the user ID and the at least one device ID having been input.

Figure 14:
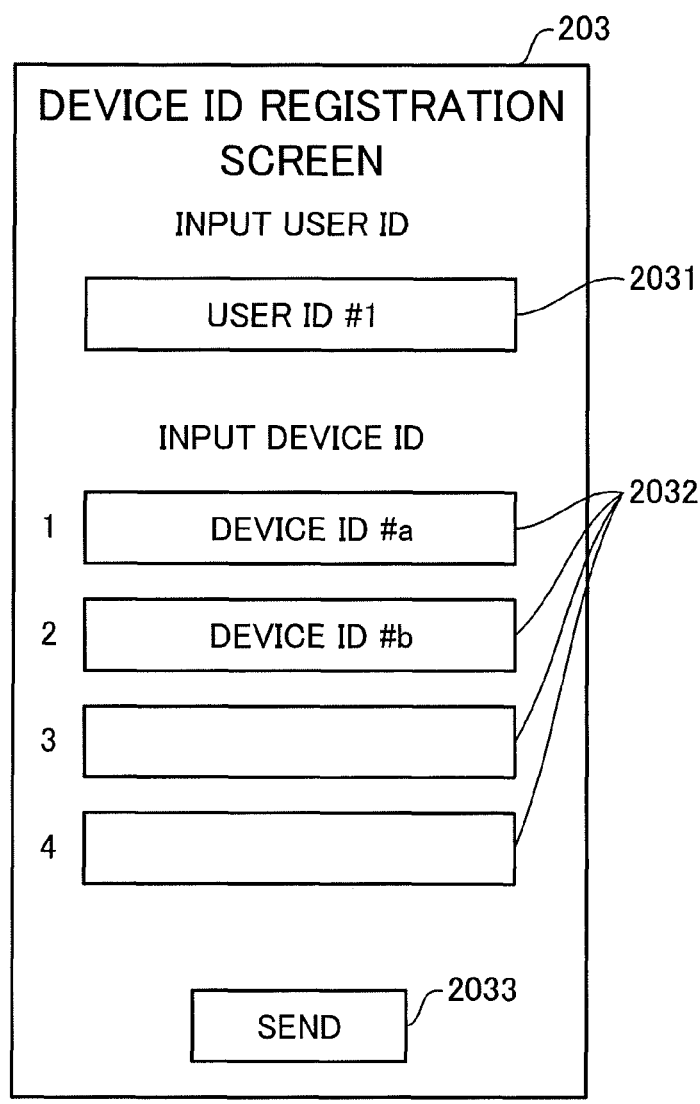
FIG. 14 is a diagram illustrating an example of a device ID registration screen displayed on the first integrated terminal in the present embodiment.

FIG. 14 is a diagram illustrating an example of the device ID registration screen displayed on the first integrated terminal 3A in the present embodiment.

The first integrated terminal 3A displays a device ID registration screen 203 illustrated in FIG. 14. The device ID registration screen 203 includes a user ID input field 2031 for inputting a user ID and a device ID input field 2032 for inputting at least one device ID for identifying at least one device used in the first residence 8. On the device ID registration screen 203, one user who uses the first residence 8 inputs his/her own user ID into the user ID input field 2031. Here, three users U1, U2, and U3 use the first residence 8. The first integrated terminal 3A receives input of a user ID by one user U1 of the three users U1, U2, and U3 who use the first residence 8. On the device ID registration screen 203, the user ID of the user U1 is input.

On the device ID registration screen 203, one user who uses the first residence 8 inputs at least one device ID for identifying at least one device used in the first residence 8 into the device ID input field 2032. The device ID is a serial number unique to a device, and is indicated on a label attached to a body of a device. Here, two devices 5A and 5B are used in the first residence 8. The user U1 inputs, as the device ID, a serial number indicated on the label attached to the body of each of the device 5A and 5B. The first integrated terminal 3A receives input of the device ID of each of the devices 5A and 5B by the user U1. On the device ID registration screen 203, the device ID of the each of the devices 5A and 5B is input.

The device ID registration screen 203 includes a send button 2033 for sending the user ID and the at least one device ID having been input. When the send button 2033 is touched, a device ID registration request is sent to the ID management server 1.

In FIG. 11, in step S22, the communication unit 13 of the ID management server 1 receives the device ID registration request sent by the first integrated terminal 3A.

Next, in step S23, the device ID registration processor 103 refers to the family ID management table and specifies the family ID associated with the user ID included in the device ID registration request received by the communication unit 13.

Then, in step S24, the device ID registration processor 103 refers to the home ID management table and specifies the first home ID associated with the specified family ID.

In step S25, the device ID registration processor 103 registers the specified first home ID and at least one device ID included in the home ID registration request received by the communication unit 13 in the device ID management table in association with each other.

In step S26, the communication unit 13 sends, to the first integrated terminal 3A, a device ID registration completion notification for notifying that the registration of the at least one device ID has been completed.

In step S27, the first integrated terminal 3A receives the device ID registration completion notification sent by the ID management server 1.

In step S28, the first integrated terminal 3A displays a registration completion notification screen for notifying the user that the registration of the first home ID and the at least one device ID has been completed.

The above processing of steps S19 to S28 is the device ID registration processing.

In the present embodiment, the family ID registration processing in steps S1 to S9, the home ID registration processing in steps S10 to S18, and the device ID registration processing in steps S19 to S28 are performed in time series, but the present disclosure is not limited thereto. The family ID registration processing, the home ID registration processing, and the device ID registration processing may be individually performed.

The family ID registration processing, the home ID registration processing, and the device ID registration processing illustrated in FIGS. 9 to 11 may be performed by the mobile terminal 4 and the ID management server 1.

The following is a description of home ID registration change processing by the ID management system according to the embodiment of the present disclosure.

Figure 15:
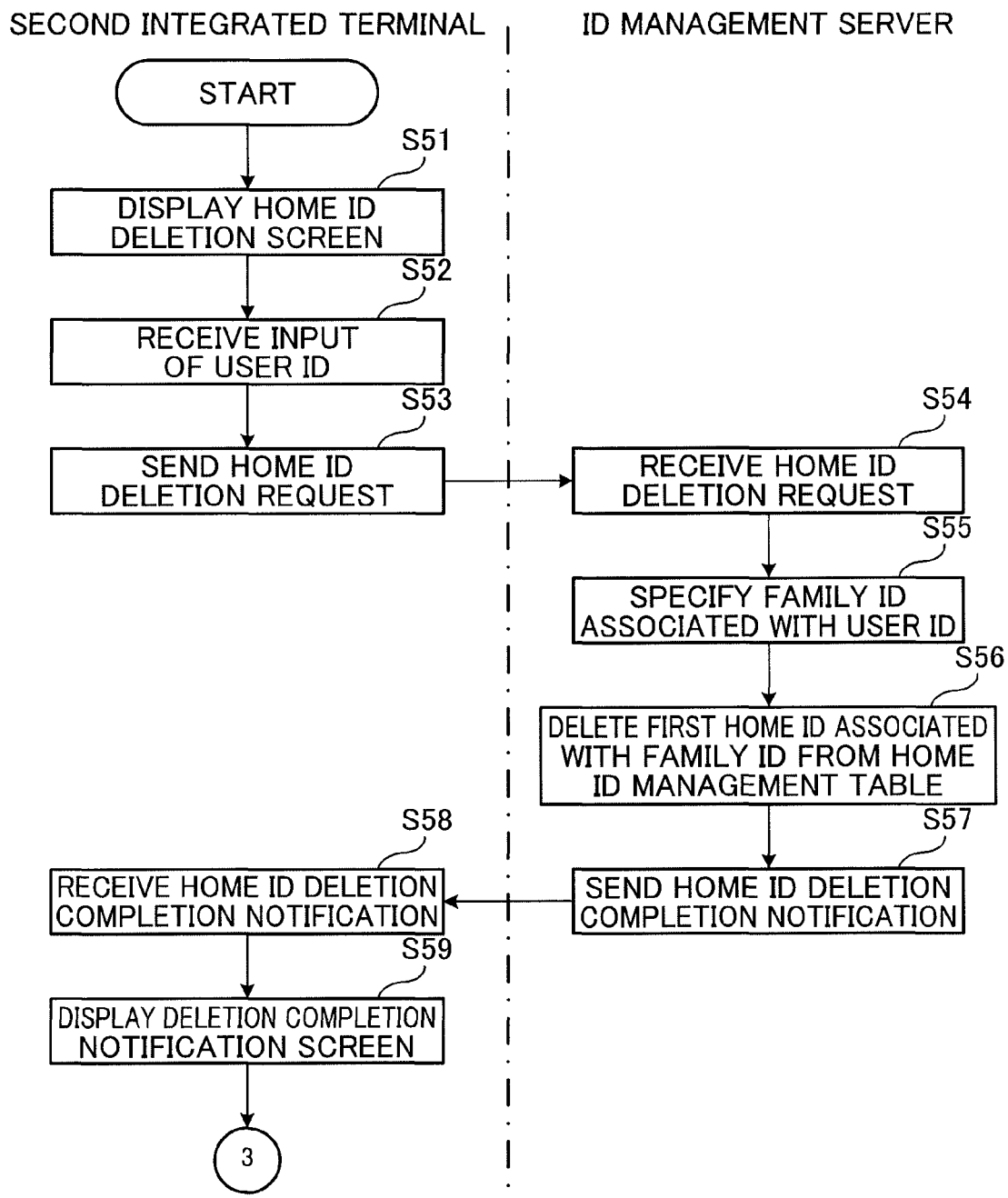
FIG. 15 is a first flowchart for describing home ID registration change processing by the ID management system according to the embodiment of the present disclosure.
Figure 16:
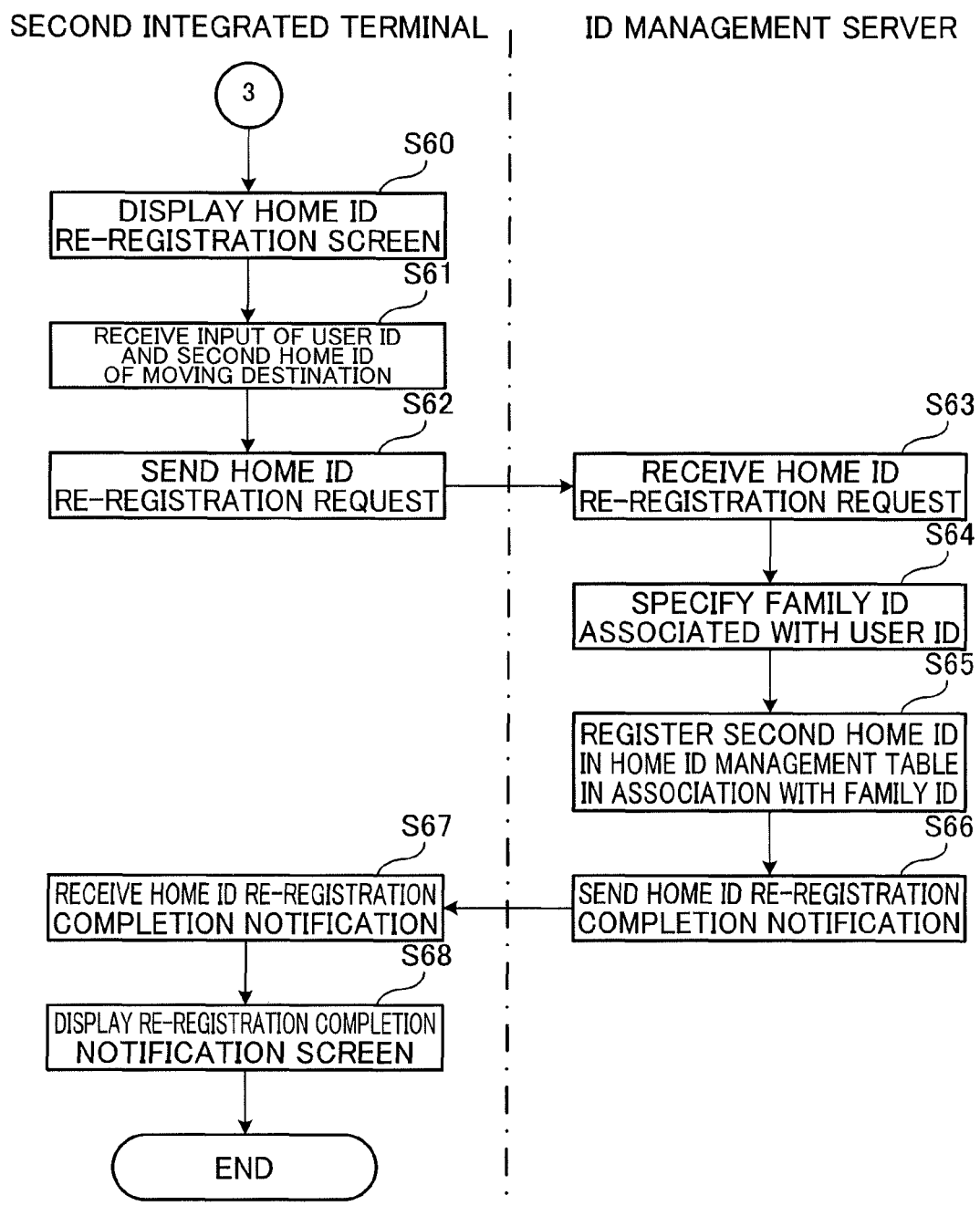
FIG. 16 is a second flowchart for describing the home ID registration change processing by the ID management system according to the embodiment of the present disclosure.

FIG. 15 is a first flowchart for describing the home ID registration change processing by the ID management system according to the embodiment of the present disclosure, and FIG. 16 is a second flowchart for describing the home ID registration change processing by the ID management system according to the embodiment of the present disclosure. The home ID registration change processing is performed by the second integrated terminal 3B installed in the second residence 9. The home ID registration change processing includes home ID deletion processing and home ID re-registration processing.

First, in step S51, in a case where at least one user moves from the first residence 8 to the second residence 9, the second integrated terminal 3B displays a home ID deletion screen for deleting the first home ID associated with the family ID.

In step S52, the second integrated terminal 3B receives input of the user ID.

Next, in step S53, the second integrated terminal 3B sends a home ID deletion request for deleting the first home ID associated with the family ID from the home ID management table to the ID management server 1. The home ID deletion request includes the input user ID.

Figure 17:
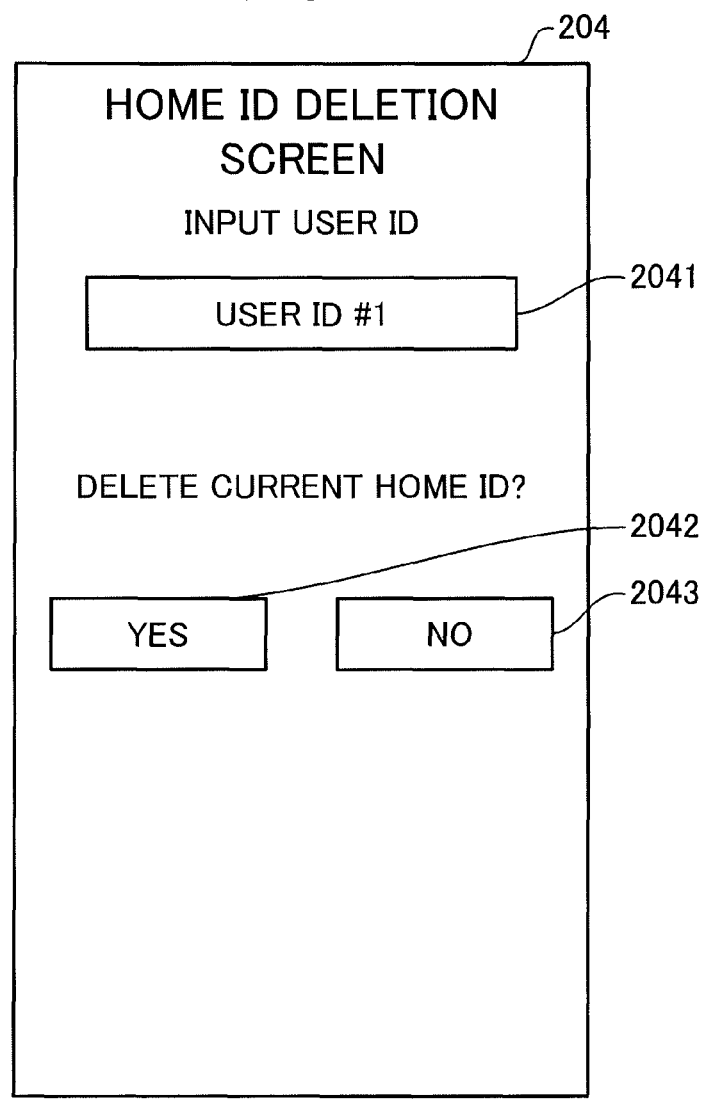
FIG. 17 is a diagram illustrating an example of a home ID deletion screen displayed on a second integrated terminal in the present embodiment.

FIG. 17 is a diagram illustrating an example of the home ID deletion screen displayed on the second integrated terminal 3B in the present embodiment.

The second integrated terminal 3B displays a home ID deletion screen 204 illustrated in FIG. 17. The home ID deletion screen 204 includes a user ID input field 2041 for inputting a user ID, a deletion request button 2042 for requesting deletion of the first home ID associated with the family ID, and a deletion rejection button 2043 for rejecting deletion of the first home ID associated with the family ID. On the home ID deletion screen 204, one user who moves from the first residence 8 to the second residence 9 inputs his/her own user ID into the user ID input field 2041. Here, three users U1, U2, and U3 move from the first residence 8 to the second residence 9. The second integrated terminal 3B receives input of a user ID by one user U1 of the three users U1, U2, and U3 who move from the first residence 8 to the second residence 9. On the home ID deletion screen 204, the user ID of the user U1 is input.

On the home ID deletion screen 204, one user who moves from the first residence 8 to the second residence 9 touches the deletion request button 2042 when requesting deletion of the first home ID associated with the family ID. When the deletion request button 2042 is touched, a home ID deletion request is sent to the ID management server 1.

On the other hand, on the home ID deletion screen 204, one user who moves from the first residence 8 to the second residence 9 touches the deletion rejection button 2043 when not requesting deletion of the first home ID associated with the family ID. When the deletion rejection button 2043 is touched, the second integrated terminal 3B displays a screen immediately before the home ID deletion screen 204, for example, a menu screen.

In FIG. 15, in step S54, the communication unit 13 of the ID management server 1 receives the home ID deletion request sent by the second integrated terminal 3B.

Next, in step S55, the home ID deletion processor 105 refers to the family ID management table and specifies the family ID associated with the user ID included in the home ID deletion request received by the communication unit 13.

Then, in step S56, the home ID deletion processor 105 deletes the first home ID associated with the specified family ID from the home ID management table.

In step S57, the communication unit 13 sends, to the second integrated terminal 3B, a home ID deletion completion notification for notifying that the deletion of the first home ID has been completed.

In step S58, the second integrated terminal 3B receives the home ID deletion completion notification sent by the ID management server 1.

In step S59, the second integrated terminal 3B displays a deletion completion notification screen for notifying the user that the deletion of the first home ID associated with the family ID has been completed.

The above processing of steps S51 to S59 is the home ID deletion processing.

In step S52, the second integrated terminal 3B may receive not only the user ID but also the input of the first home ID to be deleted by the user. In this case, the home ID deletion request includes the user ID and the first home ID. Then, when the first home ID associated with the specified family ID matches the first home ID included in the home ID deletion request, the home ID deletion processor 105 may delete the first home ID from the home ID management table.

In step S60, the second integrated terminal 3B displays a home ID re-registration screen for re-registering the family ID and the second home ID for identifying the second residence 9 as a moving destination in the home ID management table in association with each other.

In step S61, the second integrated terminal 3B receives input of the user ID and the second home ID of the moving destination.

In step S62, the second integrated terminal 3B sends, to the ID management server 1, a home ID re-registration request for re-registering the family ID and the second home ID in the home ID management table in association with each other. The home ID re-registration request includes the user ID and the second home ID having been input.

Figure 18:
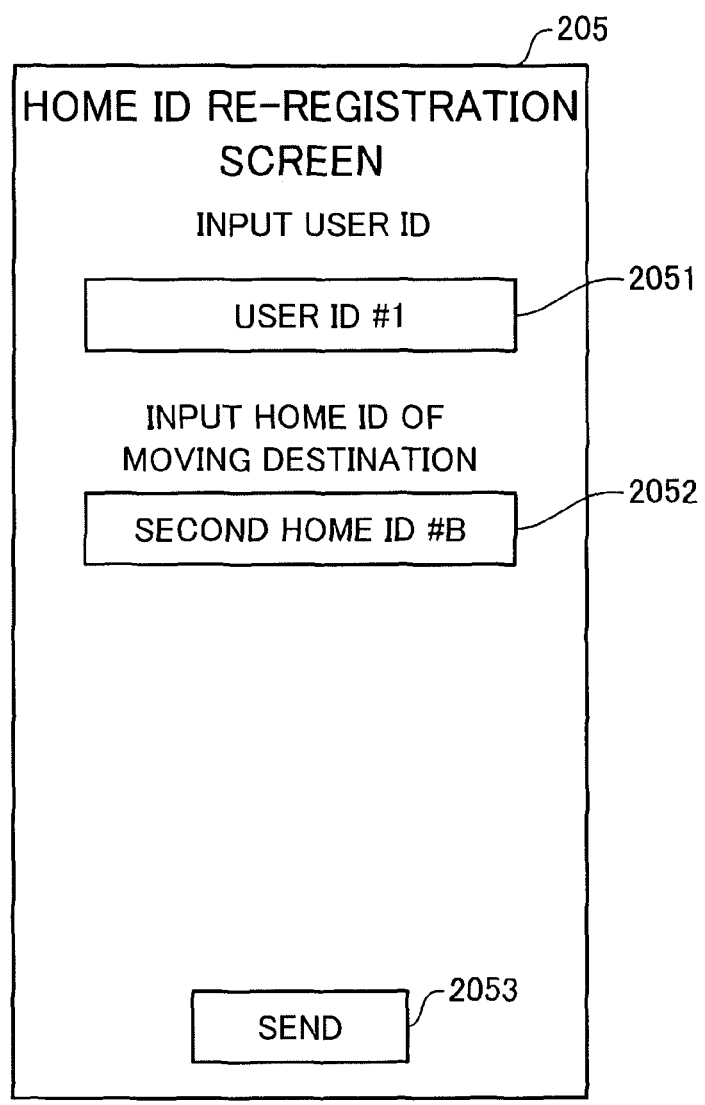
FIG. 18 is a diagram illustrating an example of a home ID re-registration screen displayed on the second integrated terminal in the present embodiment.

FIG. 18 is a diagram illustrating an example of the home ID re-registration screen displayed on the second integrated terminal 3B in the present embodiment.

The second integrated terminal 3B displays a home ID re-registration screen 205 illustrated in FIG. 18. The home ID re-registration screen 205 includes a user ID input field 2051 for inputting a user ID and a home ID input field 2052 for inputting a second home ID for identifying the second residence 9 as the moving destination. On the home ID re-registration screen 205, one user who has moved from the first residence 8 to the second residence 9 inputs his/her own user ID into the user ID input field 2051. Here, three users U1, U2, and U3 have moved from the first residence 8 to the second residence 9. The second integrated terminal 3B receives input of a user ID by one user U1 of the three users U1, U2, and U3 who have moved from the first residence 8 to the second residence 9. On the home ID re-registration screen 205, the user ID of the user U1 is input.

On the home ID re-registration screen 205, one user who have moved from the first residence 8 to the second residence 9 inputs the second home ID for identifying the second residence 9 as the moving destination into the home ID input field 2052. The user U1 inputs, as the second home ID, the serial number indicated on the label attached to the body of the second integrated terminal 3B installed in the second residence 9. The second integrated terminal 3B receives input of the second home ID by the user U1. On the home ID re-registration screen 205, the second home ID of the second residence 9 as the moving destination is input.

The home ID re-registration screen 205 includes a send button 2053 for sending the user ID and the second home ID having been input. When the send button 2053 is touched, a home ID re-registration request is sent to the ID management server 1.

In FIG. 16, in step S63, the communication unit 13 of the ID management server 1 receives the home ID re-registration request sent by the second integrated terminal 3B.

Next, in step S64, the home ID re-registration processor 106 refers to the family ID management table and specifies the family ID associated with the user ID included in the home ID re-registration request received by the communication unit 13.

Then, in step S65, the home ID re-registration processor 106 registers the second home ID included in the home ID re-registration request received by the communication unit 13 in the home ID management table in association with the specified family ID.

In step S66, the communication unit 13 sends, to the second integrated terminal 3B, a home ID re-registration completion notification for notifying that the re-registration of the second home ID has been completed.

In step S67, the second integrated terminal 3B receives the home ID re-registration completion notification sent by the ID management server 1.

In step S68, the second integrated terminal 3B displays a re-registration completion notification screen for notifying the user that the re-registration of the family ID and the second home ID has been completed.

The above processing of steps S60 to S68 is the home ID re-registration processing.

In the present embodiment, the home ID deletion processing in steps S51 to S59 and the home ID re-registration processing in steps S60 to S68 are performed in time series, but the present disclosure is not limited thereto. The home ID deletion processing and the home ID re-registration processing may be individually performed.

In the present embodiment, the home ID deletion processing and the home ID re-registration processing are performed by the second integrated terminal 3B installed in the second residence 9 as the moving destination and the ID management server 1, but the present disclosure is not limited thereto. The home ID deletion processing may be performed by the first integrated terminal 3A installed in the first residence 8 before the moving and the ID management server 1, and the home ID re-registration processing may be performed by the second integrated terminal 3B installed in the second residence 9 as the moving destination and the ID management server 1.

The home ID deletion processing and the home ID re-registration processing illustrated in FIGS. 15 and 16 may be performed by the mobile terminal 4 and the ID management server 1.

As described above, at least one user ID for identifying at least one user who uses the first residence 8 and a family ID for identifying a group to which the at least one user belongs are associated with each other, the family ID and a first home ID for identifying the first residence 8 are associated with each other, and the first home ID and at least one device ID for identifying at least one device used in the first residence 8 are associated with each other. Then, in a case where the residence used by at least one user is changed from the first residence 8 to the second residence 9, the first home ID associated with the family ID is deleted, and the second home ID for identifying the second residence 9 is associated with the family ID.

Therefore, when the residence used by at least one user is changed from the first residence 8 to the second residence 9, the association between the family ID and the first home ID only need to be changed instead of changing the association between the at least one user ID and the at least one device ID. Accordingly, the association between the user ID and the device ID can be easily changed, and complicated changing of IDs can be simplified.

The following is a description of device control processing by the ID management system according to the embodiment of the present disclosure.

Figure 19:
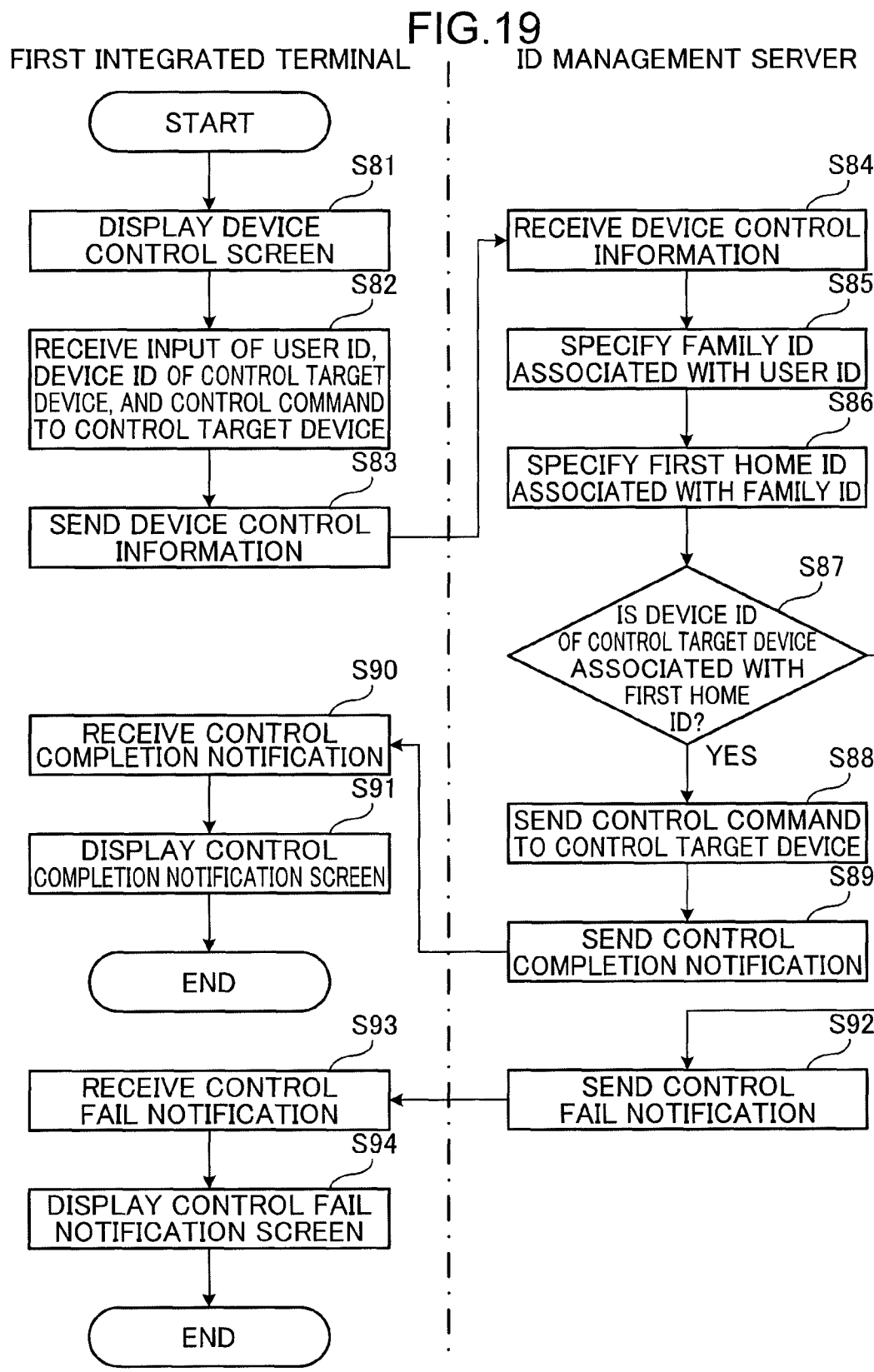
FIG. 19 is a flowchart for describing device control processing by the ID management system according to the embodiment of the present disclosure.

FIG. 19 is a flowchart for describing the device control processing by the ID management system according to the embodiment of the present disclosure. The device control processing is performed by the first integrated terminal 3A installed in the first residence 8.

First, in step S81, the first integrated terminal 3A displays a device control screen for remotely controlling a control target device among at least one device disposed in the first residence 8.

Next, in step S82, the first integrated terminal 3A receives input of the user ID of the user who operates the control target device, the device ID of the control target device, and a control command to the control target device.

In step S83, the first integrated terminal 3A sends device control information for remotely controlling the control target device to the ID management server 1. The device control information includes the user ID, the device ID, and the control having been input.

For example, when the control target device is a device that opens and closes a shutter, the first integrated terminal 3A receives input of a control command for opening the shutter or a control command for closing the shutter. For example, when the control target device is a lighting device, the first integrated terminal 3A receives input of a control command for turning on the lighting device or a control command for turning off the lighting device. When the first integrated terminal 3A stores a table in which a device name and the device ID are associated with each other, the first integrated terminal 3A may receive input of the name of the control target device instead of the device ID of the control target device. For example, the first integrated terminal 3A may receive input of a name of a control target device such as "lighting device of living room" or "lighting device of kitchen", and read a device ID associated with the input name from the table.

Next, in step S84, the communication unit 13 of the ID management server 1 receives the device control information sent by the first integrated terminal 3A.

Then, in step S85, the device controller 104 refers to the family ID management table and specifies the family ID associated with the user ID included in the device control information received by the communication unit 13.

In step S86, the device controller 104 refers to the home ID management table and specifies the first home ID associated with the specified family ID.

In step S87, the device controller 104 refers to the device ID management table and determines whether the device ID of the control target device included in the device control information received by the communication unit 13 is associated with the specified first home ID.

Here, when it is determined that the device ID of the control target device is associated with the first home ID (YES in step S87), in step S88, the communication unit 13 sends a control command included in the device control information received by the communication unit 13 to the control target device.

Then, in step S89, the communication unit 13 sends, to the first integrated terminal 3A, a control completion notification for notifying that the remote control for the control target device has been completed.

In step S90, the first integrated terminal 3A receives the control completion notification sent by the ID management server 1.

In step S91, the first integrated terminal 3A displays a control completion notification screen for notifying the user that the remote control of the control target device has been completed.

On the other hand, when it is determined that the device ID of the control target device is not associated with the first home ID (NO in step S87), in step S92, the communication unit 13 sends a control fail notification for notifying that the control target device cannot be remotely controlled to the first integrated terminal 3A.

Thereafter, in step S93, the first integrated terminal 3A receives the control fail notification sent by the ID management server 1.

In step S94, the first integrated terminal 3A displays a control fail notification screen for notifying the user that the first integrated terminal 3A cannot remotely control the control target device.

Note that the device control processing illustrated in FIG. 19 may be performed by the mobile terminal 4 and the ID management server 1.

In the present embodiment, the processor 11 may further implement a first setting registration processor that registers a family ID (group ID) and setting information of at least one device set in accordance with a lifestyle of at least one user in a first setting information storage in association with each other. The memory 12 may further implement a first setting information storage that associates a family ID (group ID) with setting information of at least one device set in accordance with a lifestyle of at least one user.

In a case where the building used by at least one user is changed from the first building to the second building, the processor 11 may leave the association between the family ID (group ID) and the setting information of each of the plurality of devices in the first setting information storage, and may delete the association between the family ID (group ID) and the setting information of a single device from the first setting information storage.

The setting information may include, for example, setting information of a lighting device provided in a bedroom in which a light is turned on at a wake-up time of the user, setting information of a music player provided in the bedroom in which predetermined music is output at the wake-up time of the user, and setting information of a shutter opening and closing device provided in the bedroom in which a shutter is opened at the wake-up time of the user. The setting information may include, for example, setting information of a music player provided in a kitchen in which predetermined music is output in a time zone when the user cooks breakfast, lunch, or dinner.

The setting information may include, for example, setting information of a hot water supply that stores hot water in a hot water tank by the time when the user takes a bath. The setting information may include, for example, setting information of a device that does not perform an operation according to the wake-up time of the user on a holiday. The setting information may include, for example, setting information of a lighting device provided at a staircase where lighting is turned on at night. The setting information may include, for example, setting information of a music player that outputs refreshing music in a morning time zone, setting information of a music player that outputs up-tempo music in a time zone when the user is doing housework, and setting information of a music player that outputs relaxing music in a time zone when the user sleeps. The setting information may include, for example, temperature setting information of an air conditioner. The setting information may include, for example, setting information of a device according to preference of the user.

In this case, the setting information of at least one device set in accordance with the lifestyle of at least one user is associated with the family ID. Thus, when the user moves from the first residence 8 to the second residence 9, the setting information of at least one device set in the first residence 8 is also taken over to the second residence 9. Therefore, the user does not need to newly input the setting information of at least one device in the second residence 9 as the moving destination, and complicated inputting of the setting information can be omitted.

When the user moves from the first residence 8 to the second residence 9, the ID management server 1 may change the association of the setting information of the device with the family ID such that the setting information using a plurality of devices disposed in the first residence 8 is taken over to the second residence 9 and the setting information using a single device disposed in the first residence 8 is not taken over to the second residence 9. This is because the setting information using a plurality of devices is more likely to be created depending on the lifestyle of the user than the setting information using a single device.

Furthermore, the ID management server 1 may refer to the information on an installation place of each of the plurality of relocatable devices, and may change the association of the setting information of the devices with the family ID such that the setting information using the plurality of devices having the same arrangement place is taken over to the second residence 9, and the setting information using the plurality of devices having different arrangement places is not taken over to the second residence 9. This is because it is considered that the setting information using the plurality of devices having the same arrangement place is less required to be set depending on the residence than the setting information using the plurality of devices having different arrangement places.

After the plurality of devices are relocated to the second residence 9, the first integrated terminal 3A or the second integrated terminal 3B may inquire by using the display whether to take over the setting information using the plurality of devices to the second residence 9. Then, the first integrated terminal 3A or the second integrated terminal 3B may receive a response input by the user by using the input unit as to whether to take over the setting information using the plurality of devices to the second residence 9. When receiving a response from the user as to whether to take over to the second residence 9, the ID management server 1 may change the association of the setting information of the plurality of devices with the family ID. Note that the first integrated terminal 3A or the second integrated terminal 3B may inquire by using the display whether to leave the setting information not to be taken over to the second residence 9 in the first residence 8. Then, the first integrated terminal 3A or the second integrated terminal 3B may receive a response input by the user by using the input unit as to whether to leave the setting information not to be taken over to the second residence 9 in the first residence 8. When a response input is received that the setting information not to be taken over to the second residence 9 is not left in the first residence 8, the ID management server 1 may delete the setting information.

The setting information of the device to be taken over to the second residence 9 may be determined on the basis of the information of the device 5B to be relocated to the second residence 9.

In the present embodiment, the processor 11 may further implement a second setting registration processor that registers the first home ID (first building ID) and setting information of each of the plurality of devices fixed to the first residence 8 (first building) during a simultaneous operation of the plurality of devices in a second setting information storage in association with each other. The memory 12 may further implement a second setting information storage in which the first home ID (first building ID) is associated with setting information of each of the plurality of devices fixed to the first residence 8 (first building) during a simultaneous operation of the plurality of devices.

In a case where the building used by at least one user is changed from the first building to the second building, the processor 11 may leave the association between the first home ID (first building ID) and the setting information of each of the plurality of devices in the second setting information storage.

Note that the setting information may include, for example, setting information of a first lighting device that turns on lighting at a first rate of brightness, setting information of a second lighting device that turns on lighting at a second rate of brightness, and setting information of a third indirect lighting device that turns on lighting at a third rate of brightness. The setting information may include setting information of a first shutter opening and closing device that opens the first shutter and setting information of a second shutter opening and closing device that closes the second shutter.

In this case, the setting information of each of the plurality of devices fixed to the first residence 8 during a simultaneous operation of the plurality of devices is associated with the first home ID. Thus, in a case where the user has moved from the first residence 8 to the second residence 9, the setting information dependent on the first residence 8 is not available at the second residence 9 and thus is not taken over to the second residence 9 but is left at the first residence 8. Therefore, another user who has moved to the first residence 8 can use the setting information already associated with the first home ID, and complicated inputting of the setting information can be omitted.

Note that the first integrated terminal 3A or the second integrated terminal 3B may have functions of the processor 11 and the memory 12 of the ID management server 1.

In each embodiment, each component may be implemented by being configured with dedicated hardware or by executing a software program suitable for each component. Each component may be implemented by a program execution unit such as a CPU or a processor reading and executing a software program recorded on a recording medium such as a hard disk or a semiconductor memory. Alternatively, the program may be executed by another independent computer system by recording and transferring the program on a recording medium or transferring the program via a network.

Some or all of the functions of the devices according to the embodiment of the present disclosure are implemented as large scale integration (LSI), which is typically an integrated circuit. These may be individually integrated into one chip, or may be integrated into one chip so as to include some or all of the functions. The integrated circuit is not limited to the LSI, and may be implemented by a dedicated circuit or a general purpose processor. A field programmable gate array (FPGA) that can be programmed after manufacturing of LSI or a reconfigurable processor in which connections and settings of circuit cells inside LSI can be reconfigured may be used.

Some or all of the functions of the devices according to the embodiment of the present disclosure may be implemented by execution of a program by a processor such as a CPU.

The numbers used above are merely examples for specifically describing the present disclosure, and the present disclosure is not limited to the illustrated numbers.

The order in which the steps shown in the flowcharts are performed is merely an example for specifically describing the present disclosure, and any order other than the above may be available as long as a similar effect can be obtained. Some of the steps may be executed simultaneously (concurrently) with other steps.

The technique according to the present disclosure can easily change association between a user ID and a device ID and simplify complicated changing of IDs, and is therefore useful as a technique for managing at least one user ID for identifying at least one user who uses a building and at least one device ID for identifying at least one device used in the building since.

The invention claimed is:

1. An information processing method in an information processing device that uses a first table including at least one user ID for identifying at least one user that uses a first building is associated with a group ID for identifying a group including the at least one user, a second table including the group ID is associated with a first building ID for identifying the first building, and a third table including the first building ID is associated with at least one device ID for identifying at least one device used in the first building, the method comprising:

acquiring a deletion request for requesting deletion of the first building ID associated with the group ID based on a building used by the at least one user changing from the first building to a second building;

deleting the first building ID associated with the group ID from the second table in response to the deletion request; and registering a second building ID for identifying the second building in the second table in association with the group ID.

2. The information processing method according to claim 1, further comprising:

acquiring a device ID of a control target device among the at least one device, a user ID of a user that uses the control target device among the at least one user, and a control command for the control target device;

referring to the first table and specifying a group ID associated with the user ID having been acquired;

referring to the second table and specifying a first building ID associated with the group ID having been specified; and referring to the third table, and sending the control command having been acquired to the control target device based on the device ID having been acquired being associated with the first building ID having been specified.

3. The information processing method according to claim 1, wherein the at least one device includes a device fixed to the first building.

4. The information processing method according to claim 1, wherein the at least one device includes a device that is relocatable from the first building to the second building, the group ID and a device ID for identifying the device that is relocatable are associated with a fourth table, the method further comprising:

acquiring a device ID of a control target device among the at least one device, a user ID of a user that uses the control target device among the at least one user, and a control command for the control target device;

referring to the first table and specifying a group ID associated with the user ID having been acquired; and referring to the fourth table, and sending the control command having been acquired to the control target device based on the device ID having been acquired being associated with the group ID having been specified.

5. The information processing method according to claim 1, further comprising registering the second building ID and at least one device ID for identifying at least one device used in the second building in the third table in association with each other.

6. The information processing method according to claim 1, wherein the group ID and setting information of the at least one device set in accordance with a lifestyle of the at least one user are associated with a first setting information storage, the method further comprising:

based on the building used by the at least one user changing from the first building to the second building, leaving association between the group ID and setting information of each of the plurality of devices in the first setting information storage, and deleting association between the group ID and setting information of a single device from the first setting information storage.

7. The information processing method according to claim 1, wherein the first building ID and setting information of each of a plurality of devices fixed to the first building during a simultaneous operation of the plurality of devices are associated with a second setting information storage, the method further comprising, based on the building used by the at least one user changing from the first building to the second building, leaving association between the first building ID and the setting information of each of the plurality of devices in the second setting information storage.

8. A non-transitory computer readable recording medium storing an information processing program for using a first table including at least one user ID for identifying at least one user that uses a first building is associated with a group ID for identifying a group including the at least one user, a second table including the group ID is associated with a first building ID for identifying the first building, and a third table including the first building ID is associated with at least one device ID for identifying at least one device used in the first building, the program causing a computer to execute processing of:

acquiring a deletion request for requesting deletion of the first building ID associated with the group ID based on a building used by the at least one user changing from the first building to a second building, deleting the first building ID associated with the group ID from the second table in response to the deletion request; and registering a second building ID for identifying the second building in the second table in association with the group ID.

9. An information processing device that uses a first table including at least one user ID for identifying at least one user that uses a first building is associated with a group ID for identifying a group including the at least one user, a second table including the group ID is associated with a first building ID for identifying the first building, and a third table including the first building ID is associated with at least one device ID for identifying at least one device used in the first building, the device comprising:

a deletion request acquisition unit that acquires a deletion request for requesting deletion of the first building ID associated with the group ID based on a building used by the at least one user changing from the first building to a second building;

a deletion processor that deletes the first building ID associated with the group ID from the second table in response to the deletion request; and a registration processor that registers a second building ID for identifying the second building in the second table in association with the group ID.

* * * * *